United States Patent
Schwarck

(10) Patent No.: US 9,121,393 B2
(45) Date of Patent: Sep. 1, 2015

(54) PASSIVE HEAT EXTRACTION AND ELECTRICITY GENERATION

(75) Inventor: Matthew N. Schwarck, Louisville, CO (US)

(73) Assignee: Schwarck Structure, LLC, Saint Ansgar, IA (US)

( * ) Notice: Subject to any disclaimer, the term of this patent is extended or adjusted under 35 U.S.C. 154(b) by 156 days.

(21) Appl. No.: 13/992,586

(22) PCT Filed: Dec. 12, 2011

(86) PCT No.: PCT/US2011/064425
§ 371 (c)(1),
(2), (4) Date: Sep. 3, 2013

(87) PCT Pub. No.: WO2012/079078
PCT Pub. Date: Jun. 14, 2012

(65) Prior Publication Data
US 2013/0333383 A1    Dec. 19, 2013

Related U.S. Application Data

(60) Provisional application No. 61/421,996, filed on Dec. 10, 2010.

(51) Int. Cl.
*F03G 7/00* (2006.01)
*F03G 7/04* (2006.01)
*F24J 3/08* (2006.01)

(52) U.S. Cl.
CPC ... *F03G 7/04* (2013.01); *F24J 3/08* (2013.01); *F24J 3/084* (2013.01); *Y02E 10/125* (2013.01)

(58) Field of Classification Search
CPC ............... F03G 7/04; F24J 3/08; F24J 3/084; Y02E 10/125
USPC .............................................. 60/641.1–641.7
See application file for complete search history.

(56) References Cited

U.S. PATENT DOCUMENTS

| | | |
|---|---|---|
| 3,613,773 A | 10/1971 | Hall et al. |
| 3,769,674 A | 11/1973 | Droughton et al. |
| 3,807,493 A | 4/1974 | Stewart |
| 3,911,683 A | 10/1975 | Wolf |

(Continued)

FOREIGN PATENT DOCUMENTS

WO    WO 2010/021618 A1    2/2010

OTHER PUBLICATIONS

Amili et al., "Stability of Heat Pipes in Vapor-Dominated Systems", Proceedings, Twenty-Fourth Workshop on Geothermal Reservoir Engineering, Stanford University, Stanford, California, Jan. 25-27, 1999, pp. 1-6.

(Continued)

*Primary Examiner* — Hoang Nguyen
(74) *Attorney, Agent, or Firm* — Patterson Thuente Pedersen, P.A.

(57) ABSTRACT

A closed-loop heat exchange system and related methods for harnessing subterranean heat energy from a subterranean zone having a passive heat transfer device with multiple operational modes for targeting hotspots within the subterranean zone and adjusting the rate of energy harnessed according to consumption demands. The system can also have at least one enhanced surface section for increasing the heat exchange efficiency and/or a variable pump for controlling the rate at which the working fluid travels through the passive heat transfer device.

20 Claims, 18 Drawing Sheets

(56) References Cited

U.S. PATENT DOCUMENTS

| | | | |
|---|---|---|---|
| 3,933,198 A | 1/1976 | Hara et al. | |
| 3,985,182 A | 10/1976 | Hara et al. | |
| 3,986,362 A | 10/1976 | Baciu | |
| 4,033,406 A | 7/1977 | Basiulis | |
| 4,047,093 A | 9/1977 | Levoy | |
| 4,051,677 A | 10/1977 | Van Huisen | |
| 4,051,889 A | 10/1977 | Stoddard et al. | |
| 4,052,854 A | 10/1977 | du Pré et al. | |
| 4,052,857 A | 10/1977 | Altschuler | |
| 4,054,176 A * | 10/1977 | Van Huisen | 165/45 |
| 4,067,237 A | 1/1978 | Arcella | |
| 4,094,356 A | 6/1978 | Ash et al. | |
| 4,106,554 A | 8/1978 | Arcella | |
| 4,226,282 A | 10/1980 | Kunsagi et al. | |
| 4,255,933 A | 3/1981 | Bailey et al. | |
| 4,290,266 A | 9/1981 | Twite et al. | |
| 4,342,197 A | 8/1982 | Matthews | |
| 4,353,415 A | 10/1982 | Klaschka et al. | |
| 4,375,153 A | 3/1983 | Wahl, III | |
| 4,407,127 A | 10/1983 | Shiraki et al. | |
| 4,448,238 A | 5/1984 | Singleton, Jr. et al. | |
| 4,479,351 A | 10/1984 | Awerbuch et al. | |
| 4,512,156 A | 4/1985 | Nagase | |
| 4,556,101 A | 12/1985 | Haldeman | |
| 4,566,532 A | 1/1986 | Basmajian | |
| 4,631,388 A | 12/1986 | Manning | |
| 4,642,987 A | 2/1987 | Csorba et al. | |
| 4,644,750 A | 2/1987 | Lockett et al. | |
| 4,664,181 A | 5/1987 | Sumberg | |
| 4,712,380 A | 12/1987 | Smith | |
| 4,745,756 A | 5/1988 | Sederquist | |
| 4,753,072 A | 6/1988 | Johansson et al. | |
| 4,776,169 A | 10/1988 | Coles, Jr. | |
| 4,787,450 A | 11/1988 | Andersen et al. | |
| 4,799,537 A | 1/1989 | Hoke, Jr. | |
| 4,851,183 A | 7/1989 | Hampel | |
| 4,917,175 A | 4/1990 | Sakaya et al. | |
| 4,968,488 A | 11/1990 | Spevack | |
| 5,072,783 A | 12/1991 | Ayala Martinez et al. | |
| 5,095,705 A | 3/1992 | Daly | |
| 5,143,150 A | 9/1992 | Johnston | |
| 5,165,235 A | 11/1992 | Nitschke | |
| 5,183,100 A | 2/1993 | Harrell, Jr. | |
| 5,203,173 A | 4/1993 | Horton | |
| 5,253,926 A | 10/1993 | Foppe | |
| 5,272,879 A | 12/1993 | Wiggs | |
| 5,311,741 A | 5/1994 | Blaize | |
| 5,388,410 A | 2/1995 | Momose et al. | |
| 5,440,882 A | 8/1995 | Kalina | |
| 5,515,679 A | 5/1996 | Shulman | |
| 5,771,967 A | 6/1998 | Hyman | |
| 5,809,782 A | 9/1998 | Bronicki et al. | |
| 5,839,282 A | 11/1998 | Bronicki et al. | |
| 5,857,338 A | 1/1999 | Rigal | |
| 5,911,684 A | 6/1999 | Shnell | |
| 5,937,934 A | 8/1999 | Hildebrand | |
| 5,946,915 A | 9/1999 | Hays | |
| 6,009,711 A | 1/2000 | Kreiger et al. | |
| 6,062,299 A | 5/2000 | Choo et al. | |
| 6,073,448 A | 6/2000 | Lozada | |
| 6,212,890 B1 | 4/2001 | Amir | |
| 6,259,165 B1 | 7/2001 | Brewington | |
| 6,301,894 B1 | 10/2001 | Halff | |
| 6,668,554 B1 | 12/2003 | Brown | |
| 6,675,887 B2 | 1/2004 | Garner et al. | |
| 6,694,766 B1 | 2/2004 | Johnson, Jr. et al. | |
| 6,708,484 B2 * | 3/2004 | Onodera et al. | 60/286 |
| 6,708,494 B1 | 3/2004 | Hamann | |
| 6,789,610 B1 | 9/2004 | Hegde | |
| 6,827,133 B1 | 12/2004 | Luo | |
| 6,926,072 B2 | 8/2005 | Wert | |
| 7,059,131 B2 | 6/2006 | Hildebrand | |
| 7,111,394 B2 | 9/2006 | Wert | |
| 7,124,583 B2 | 10/2006 | Rider | |
| 7,147,044 B2 | 12/2006 | Hsu | |
| 7,178,337 B2 | 2/2007 | Pflanz | |
| 7,251,938 B1 | 8/2007 | Bond | |
| 7,320,221 B2 | 1/2008 | Bronicki | |
| 7,331,179 B2 | 2/2008 | Balan et al. | |
| 7,334,406 B2 | 2/2008 | Licari et al. | |
| 7,347,059 B2 * | 3/2008 | Kidwell et al. | 62/260 |
| 7,448,214 B2 | 11/2008 | Monostory et al. | |
| 7,490,657 B2 | 2/2009 | Ueyama | |
| 7,556,866 B2 | 7/2009 | Cortese et al. | |
| 7,975,482 B2 | 7/2011 | Foppe | |
| 8,002,038 B2 * | 8/2011 | Wilson | 166/312 |
| 8,020,382 B1 | 9/2011 | Zakiewicz | |
| 2006/0026961 A1 | 2/2006 | Bronicki | |
| 2009/0120091 A1 * | 5/2009 | DuBois | 60/641.3 |
| 2009/0126923 A1 * | 5/2009 | Montgomery et al. | 166/57 |
| 2009/0139687 A1 | 6/2009 | Reginster | |
| 2009/0320475 A1 | 12/2009 | Parrella | |
| 2010/0031655 A1 | 2/2010 | Brown | |
| 2010/0251710 A1 | 10/2010 | Cumplido Matesanz | |
| 2011/0024077 A1 * | 2/2011 | Asai et al. | 165/45 |
| 2011/0048005 A1 | 3/2011 | McHargue | |
| 2011/0061382 A1 | 3/2011 | Stern | |
| 2011/0067399 A1 * | 3/2011 | Rogers et al. | 60/641.2 |
| 2011/0120666 A1 | 5/2011 | Furey | |
| 2011/0147310 A1 * | 6/2011 | Ito et al. | 210/652 |
| 2011/0232858 A1 | 9/2011 | Hara | |

OTHER PUBLICATIONS

Chandra et al., "Supercritical Carbon Dioxide Circulated EGS Combined with IGCC in New Mexico", Penn State University, National Geothermal Student Competition, Jun. 2011, 150 pages.

Fragaszy et al., "Sustainable Development and Energy Geotechnology—Potential Roles for Geotechnical Engineering", KSCE Journal of Civil Engineering, vol. 15, No. 4, 2011, pp. 611-621.

Freifeld et al., "Achieving Carbon Sequestration and Geothermal Energy Production: A Win-Win!", News & Events — Berkeley Lab Earth Sciences Division, Jun. 28, 2011, 4 pages.

Galanis et al, "Electricity Generation from Low Temperature Sources", J. Applied Fluid Mechanics, vol. 2, No. 2, 2009, pp. 55-67.

Geothermal Heat Pump Loop Fields, prior to Oct. 13, 2011, 6 pages.

Gerothermal Heating & Cooling Systems, Geothermal Energy, Geothermal Power Installation, Rochester, NY, prior to Oct. 13, 2011, 3 pages.

Horizontal Energy Systems, Town & Country Heat & Air, prior to Oct. 11, 2011, 2 pages.

Gonet et al., "Heating Agent Pressure Losses in a Borehole Heat Exchanger", Proceedings World Geothermal Congress 2005, Antalya, Turkey, Apr. 24-29, 2005, 7 pages.

Kusaba et al, "Extraction of Geothermal Energy and Electric Power Generation Using a Large Scale Heat Pipe", Proceedings World Geothermal Congress 2000, Kyushu-Tohoku, Japan, May 28-Jun. 10, 2000, 6 pages.

Lockett, "Single Borehole Geothermal Energy Extraction System for Electrical Power Generation", Proceedings, Eleventh Workshop on Geothermal Reservoir Engineering, Stanford University, Stanford, California, Jan. 21-23, 1986, pp. 215-216.

Notes on 1.63 Advanced Environmental Fluid Mechanics, Instructor: C.C. Mei, 2002, 2 pages.

Niibori et al., "Design of the BHP System Considering the Heat Transport of Groundwater Flow", Proceedings World Geothermal Congress 2005, Antalya, Turkey, Apr. 24-29, 2005, 6 pages.

Wolkersdorfer, Geothermal Energy, Cape Breton University—Mine Water Remediation & Management, Geothermal Energy—A Term with plentiful Meanings, prior to Oct. 13, 2011, 21 pages.

* cited by examiner

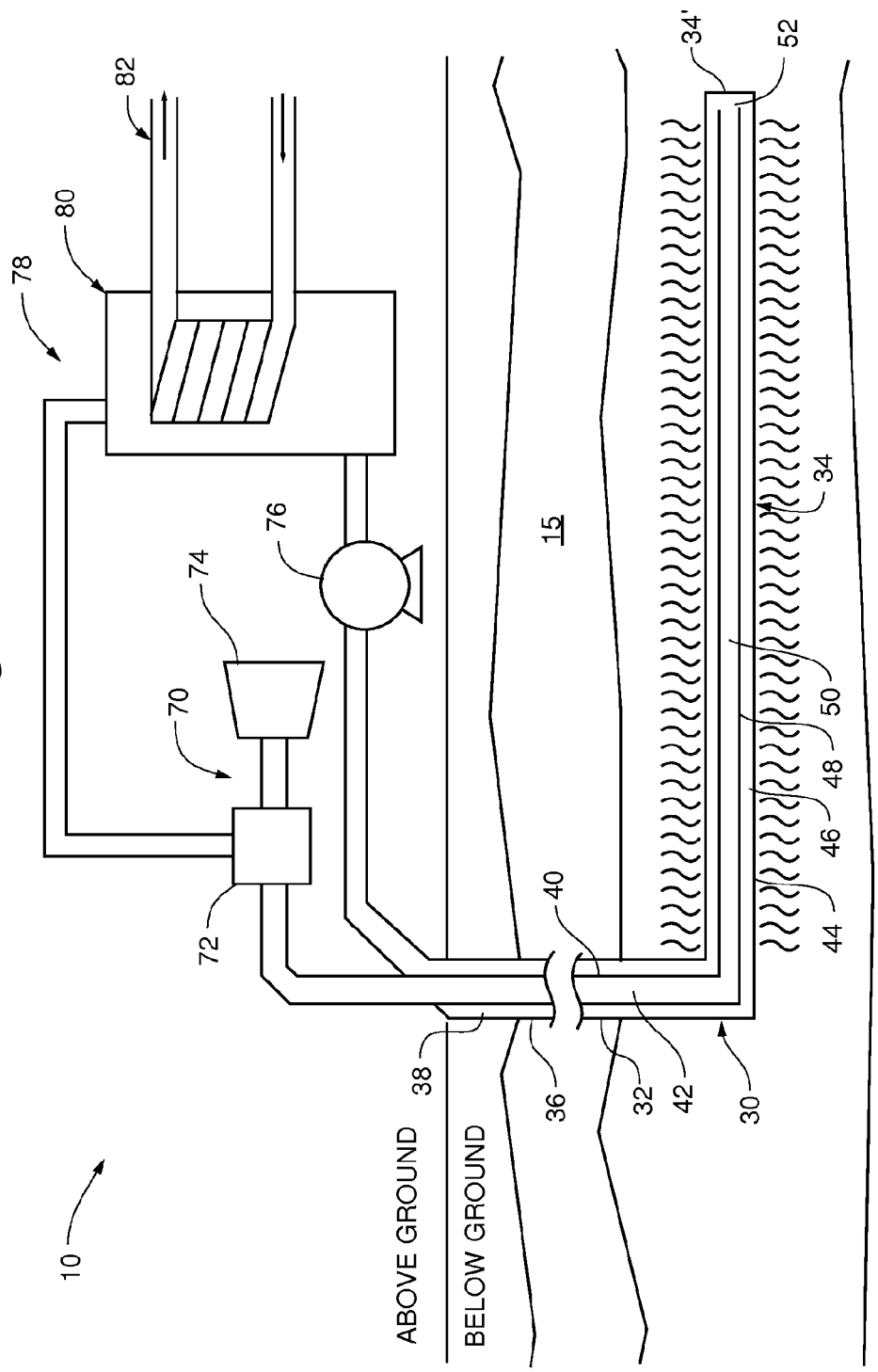

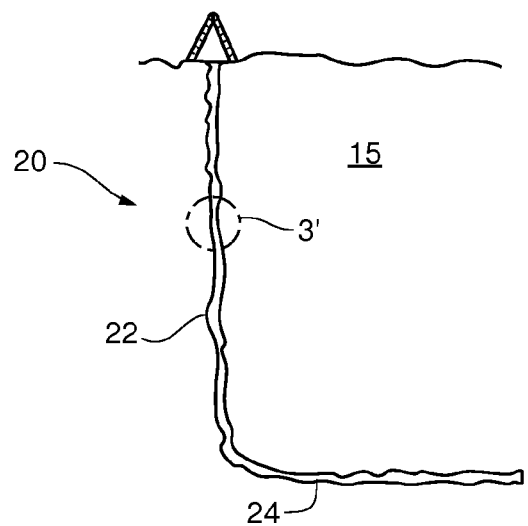
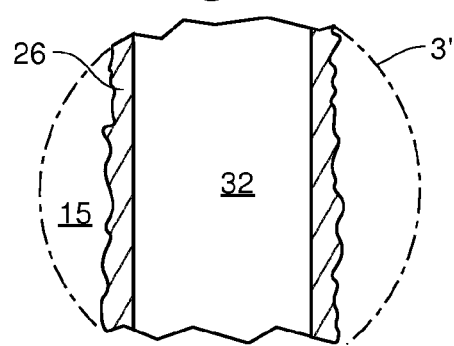

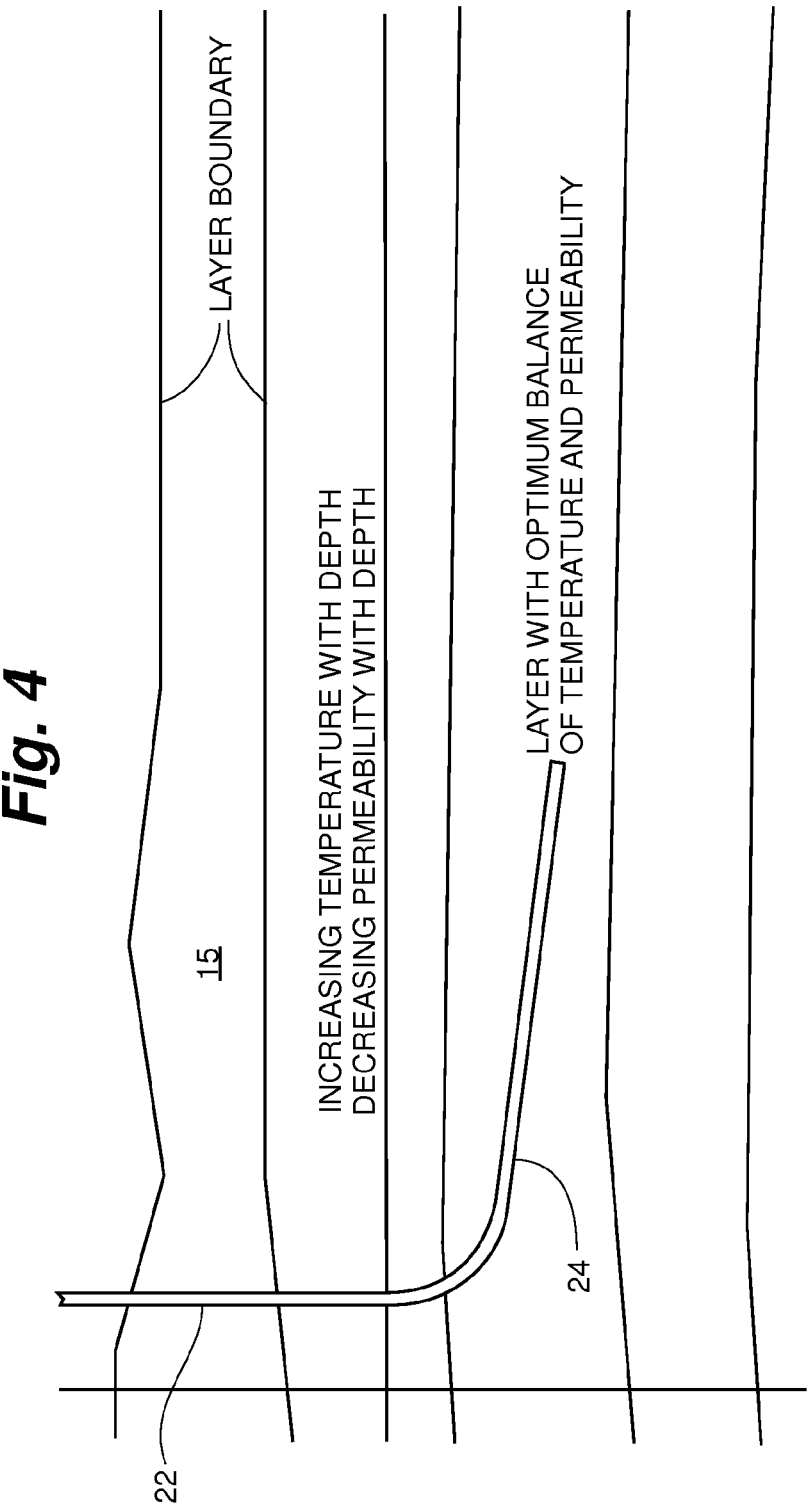

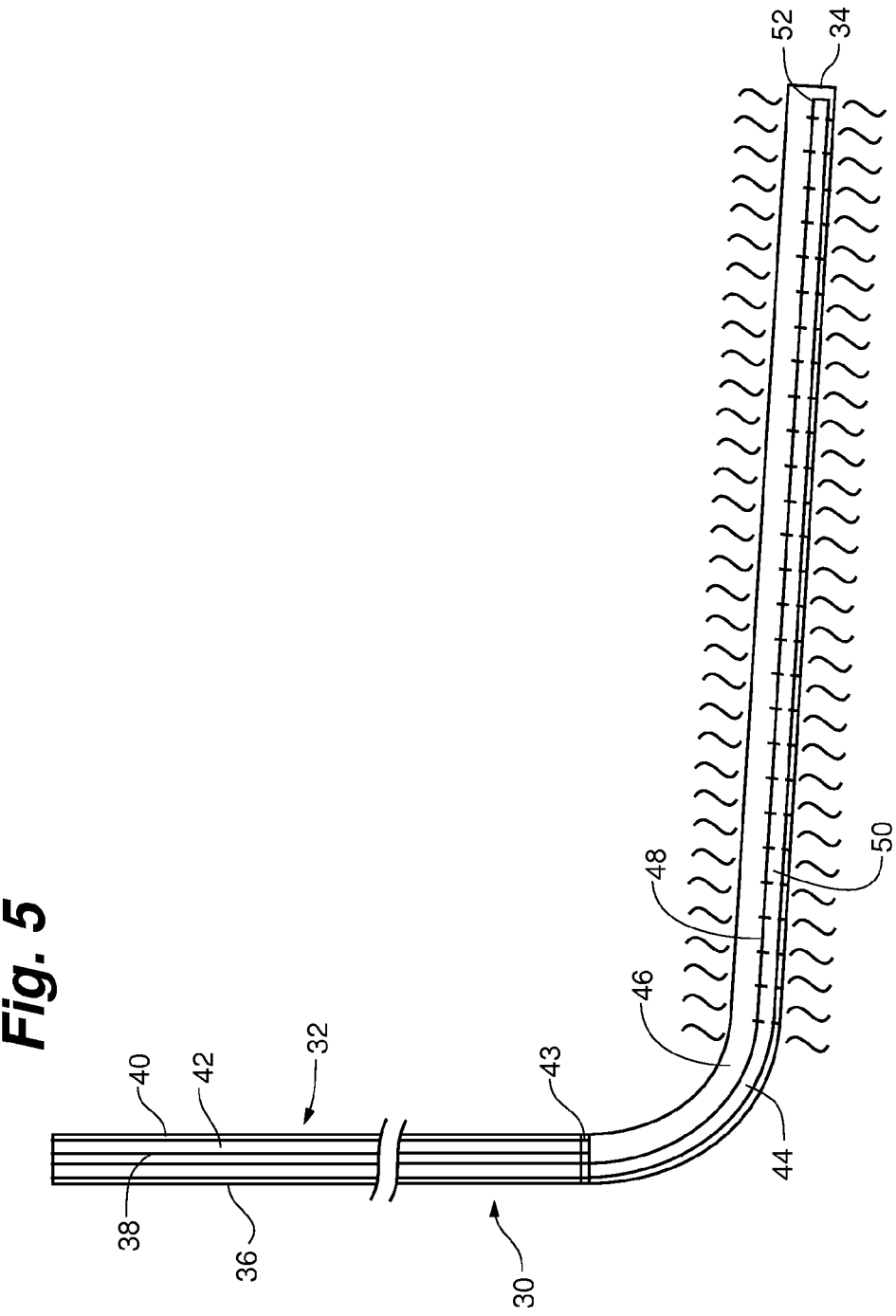

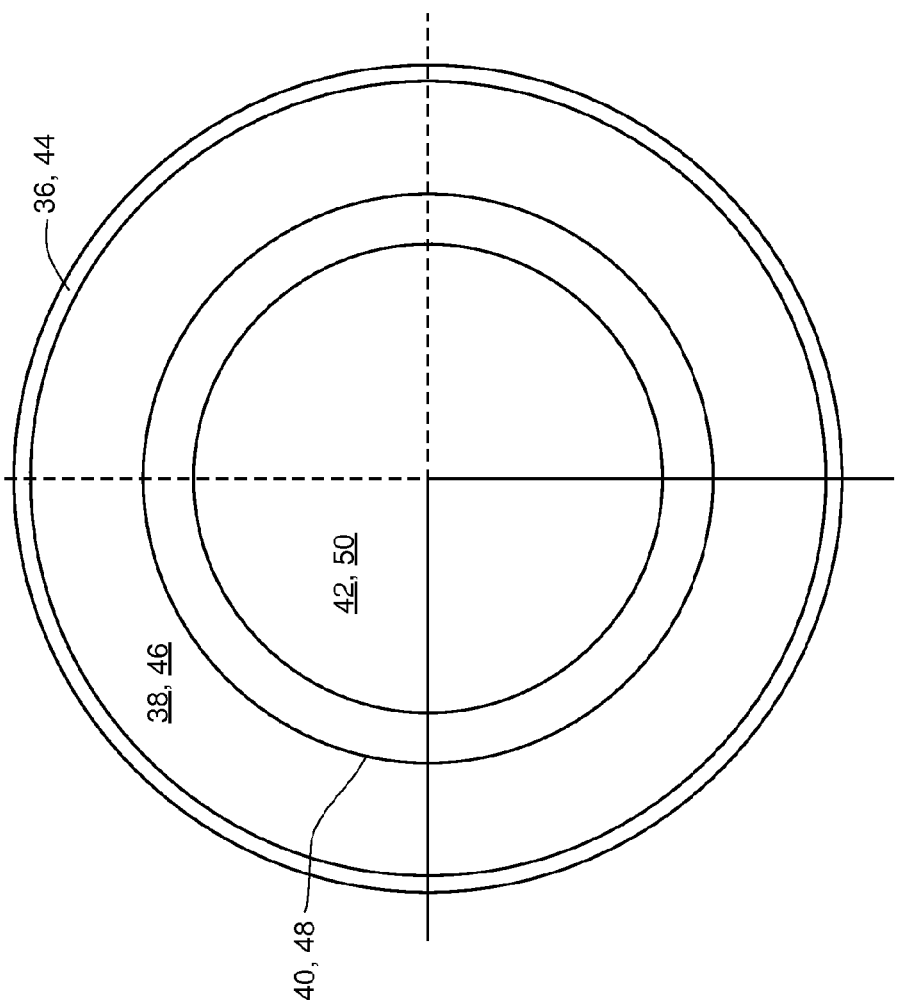

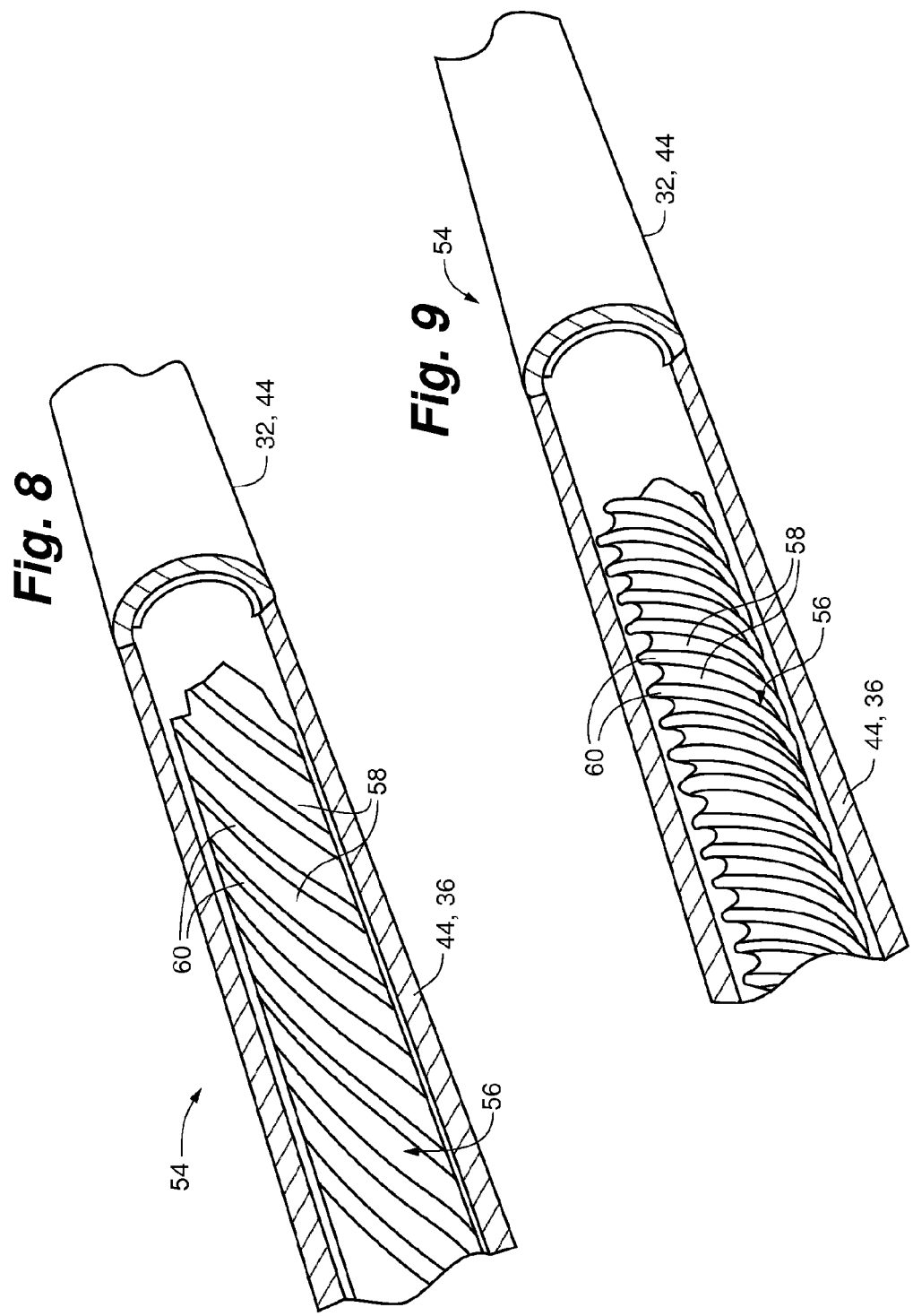

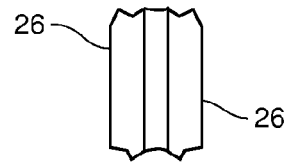
*Fig. 11A*
*Fig. 11*
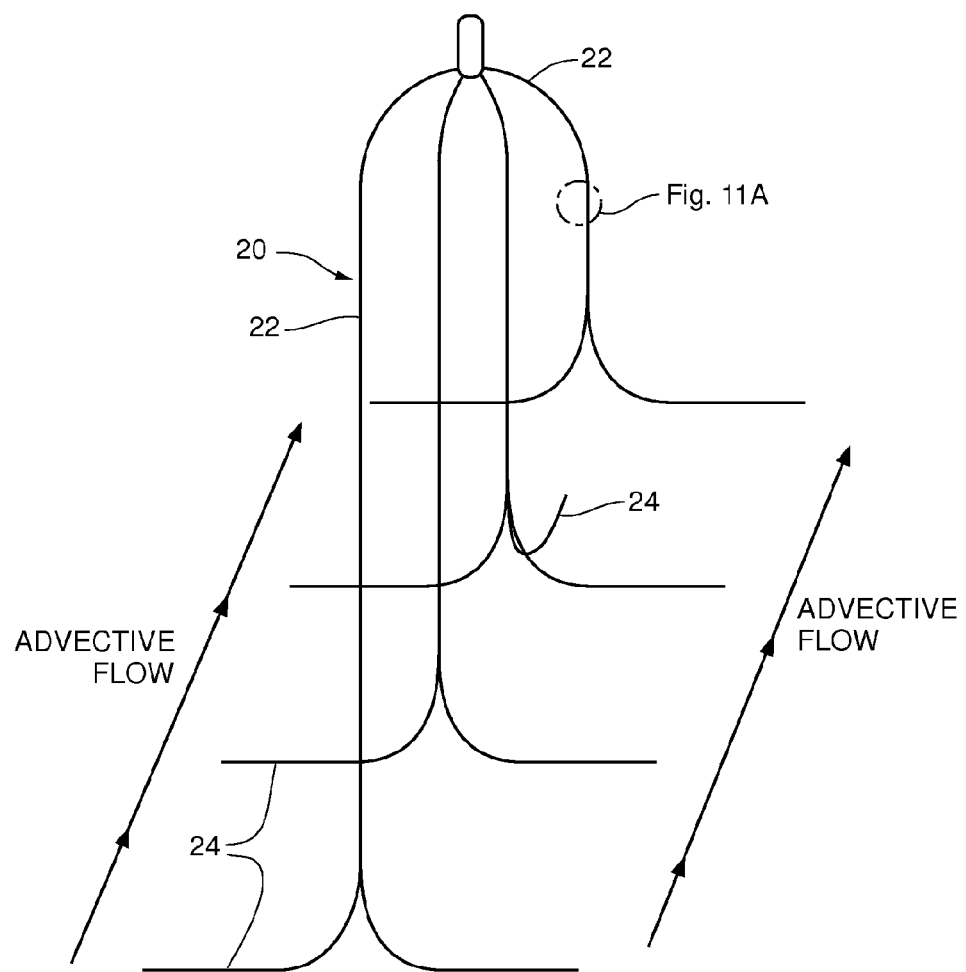

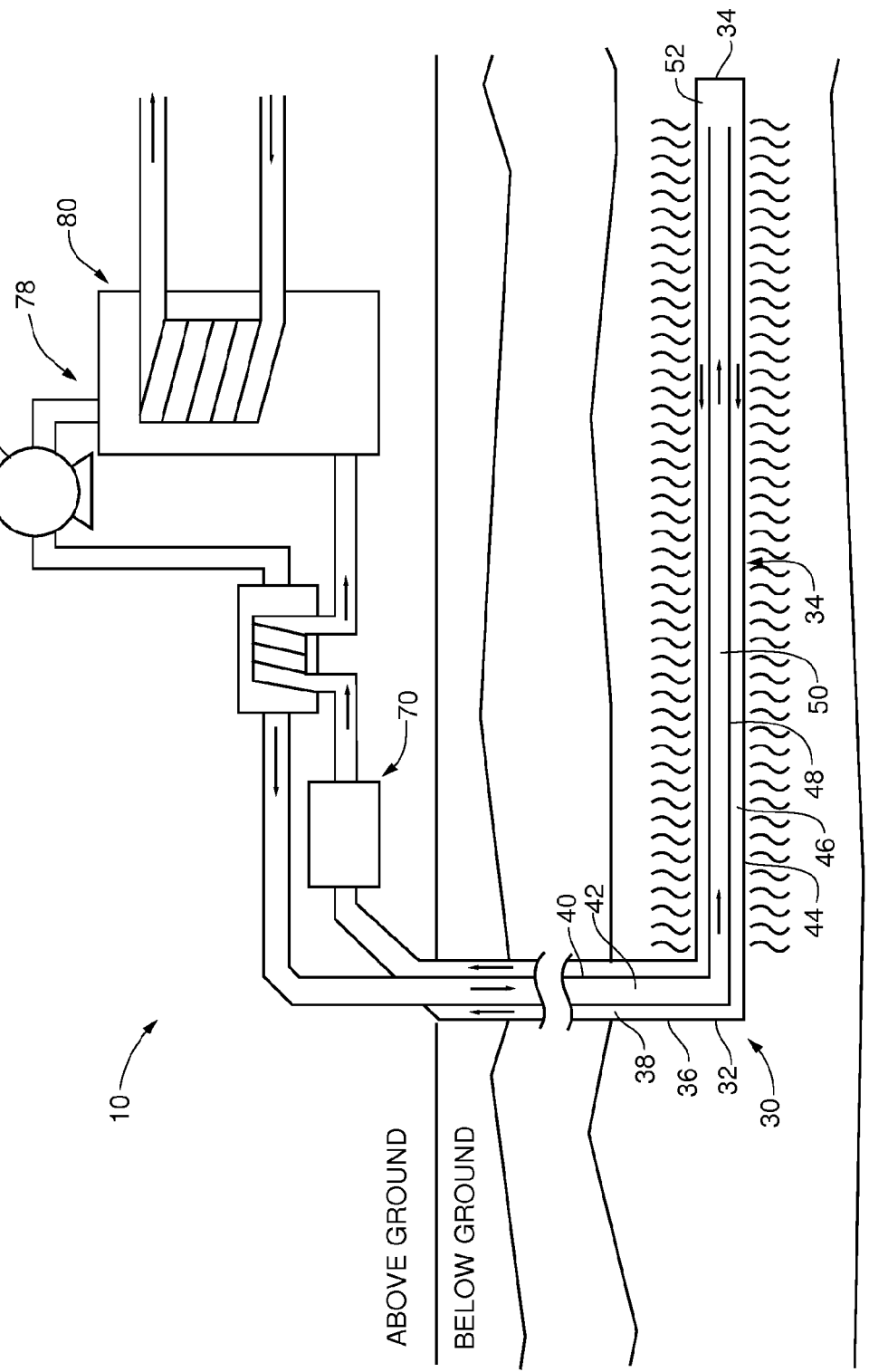

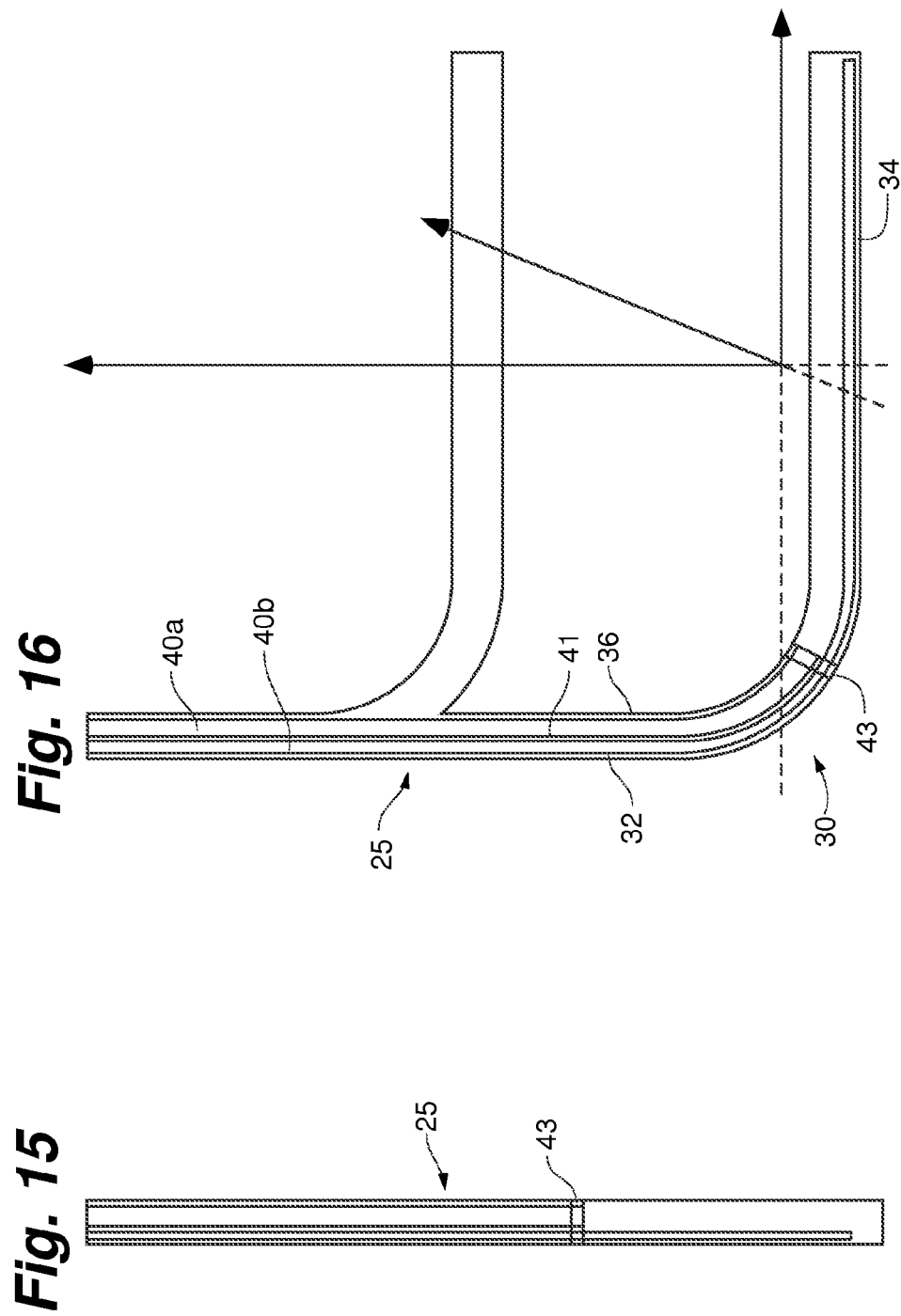

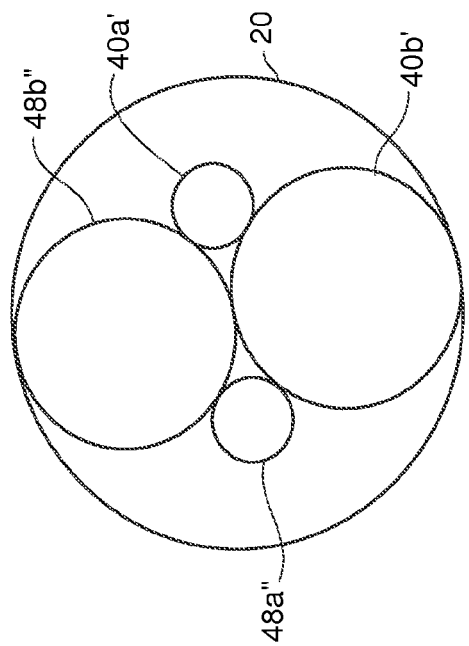
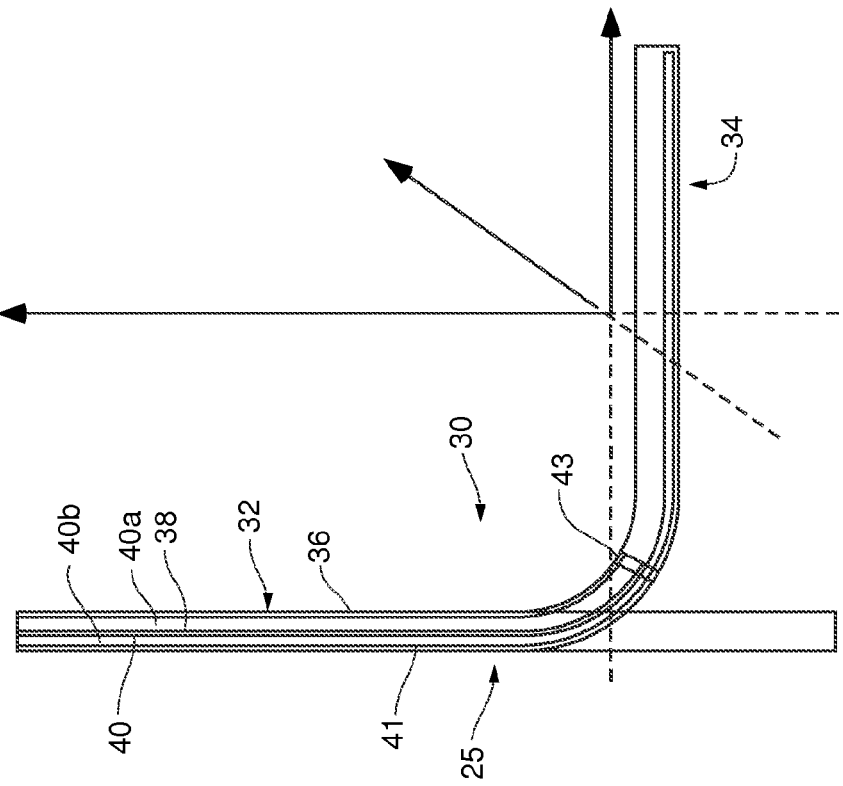

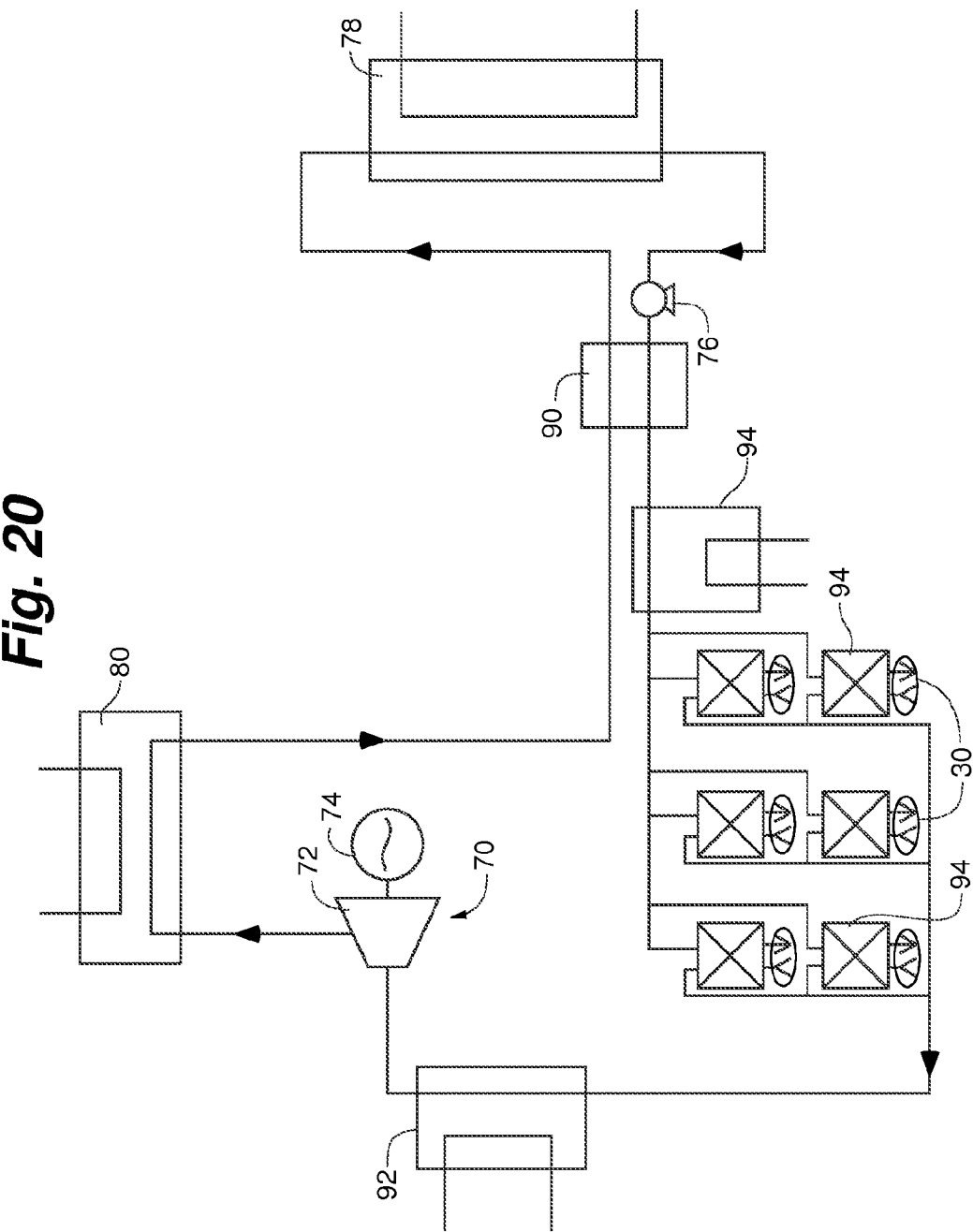

PASSIVE HEAT EXTRACTION AND ELECTRICITY GENERATION

PRIORITY CLAIM

The present application is a National Phase entry of PCT Application No. PCT/US2011/064425, filed Dec. 12, 2011, which application claims priority to U.S. Provisional Application No. 61/421,996 entitled "PASSIVE HEAT EXTRACTION AND ELECTRICITY GENERATION," filed Dec. 10, 2010, which applications are hereby incorporated by reference in their entirety.

FIELD OF THE INVENTION

The present invention is directed to a closed-loop passive heat extraction system and methods for producing energy from subterranean heat reservoirs. Specifically, the present invention is directed to a passive heat transfer apparatus for exchanging heat between a working fluid and one or more naturally occurring or manmade subterranean heat reservoirs in subterranean material.

BACKGROUND OF THE INVENTION

Subterranean heat energy has recently received increased attention as a source of environmentally friendly and renewable energy. Currently, subterranean heat energy is harnessed by boring wells into the earth's crust to access reservoirs of heated steam, high pressure water and/or brine. The heated water or brine is effectively mined like other buried natural resources and brought to the surface where the fluid is used to operate turbines or utilized in other processes.

A common approach to extracting the subterranean heat energy is to actively mine dry steam within the reservoir and feed the steam through a turbine on the surface. Alternatively, produced fluids can be vaporized in a flash tank to generate steam or passed through a heat exchanger to vaporize a secondary working fluid. An inherent drawback of these approaches is that the mined fluid taken from the reservoir must be naturally or artificially replenished to maintain flowrates and decrease land subsidence. Artificially replacing the mined fluid through reinjection is typically undesirable as a significant portion of the energy collected must be devoted to pumping replacement fluid back into the reservoir creating a large parasitic load. Other drawbacks in the mining and replenishment of the subterranean natural resources includes seismic risks, subsurface disturbance causing subterranean environmental pollution of water reservoirs, scaling in the wells, poor efficiencies, the need for replenishing the working fluid lost during normal operation, the need for sufficiently permeable aqueous reservoirs, and the like.

Due to the in situ fluid requirements, the current state of the art is only able to operate in areas where in situ reservoir fluid is present. Also, the current state of the art of subterranean heat energy extraction is limited by the temperatures in which it may operate and therefore is only capable of extracting heat from a small fraction of the overall available subterranean heat resource.

Various closed-loop apparatus approaches have been advanced, which typically comprise positioning a subterranean heat exchanger within the subterranean reservoir and pumping a working fluid through the heat exchanger. The heated working fluid is returned to the surface for use in turbines or other processes. However, the current closed-loop apparatus approaches have drawbacks relating to efficient collection of the subterranean heat energy, controlling the rate of energy production, and maximizing productivity over a period of time to sustain the heat resource, among others. Unlike other types of power generation such as gas fired power generation, adjusting the production rate of energy harnessed from subterranean heat utilizing the current state of the art can be exceedingly difficult as the production rate is largely dependent on the uncontrollable conditions within the subterranean zone.

As such, there is a need in the art for improved systems, apparatus, and methods for harnessing subterranean heat energy in an efficient manner that is cost-effective without excessively depleting the source of the subterranean heat energy and for reliable and efficient adjustment of harnessing the thermal energy according to a given consumption rate. There is also a need in the art for improved systems and methods that can utilize resources of varying temperatures within various subterranean resources having varying fluid quantities.

SUMMARY OF THE INVENTION

The present invention is generally directed to a closed-loop system and related methods for harnessing subterranean heat energy from heated subterranean zones for generation of power and other purposes. The system is implemented by using an existing wellbore or otherwise boring a substantially vertical well to a depth proximate to the targeted subterranean zone. The vertical extent of the well can terminate within or near the optimal or targeted heated subterranean zone. At least one substantially angled well can be bored outward from the end of the vertical well or from a window in the vertical casing, which in some aspects is substantially horizontal and in other aspects may be angled to traverse one or more desired heated subterranean zones.

In some aspects of the present invention, a vertical transfer section having an outer casing and an inner tubing is positioned within the vertical well. A passive heat transfer device comprising an outer casing and an inner tubing is positioned within the angled well. Rather than actively mining heated fluid from the subterranean zone, a working fluid is circulated down the vertical transfer section within the vertical well and through the passive heat transfer device within the angled well to harvest the thermal energy in the targeted subterranean zone. The heat from the targeted subterranean zone entirely or partially vaporizes the working fluid, which is returned to the surface via the vertical transfer section to power turbines, series of turbines and/or other processes.

In some aspects, the outer casings of the vertical transfer section and the angled well are operably connected, as are the respective inner tubings. In some aspects, at least a portion of the outer casing of the vertical transfer section in the vertical well and/or the passive heat transfer device have at least one enhanced outer surface to increase the contact surface area with the subterranean material and thus increase the efficiency of the heat exchange within the desired subterranean zone.

In some aspects of the present invention, the vertical transfer section and/or the passive heat transfer device comprises an outer casing and an inner tubing arranged in a concentric configuration. The annulus between the respective outer casing and the respective inner tubing defines a first flow path for the working fluid and can facilitate transfer of thermal energy between the surrounding subterranean resource and the working fluid. The space within the respective inner tubing similarly defines a second flow path for the working fluid within the vertical transfer section and/or the passive heat transfer device and may be insulated to prevent the transfer of thermal energy between the working fluid in the first fluid path and the second fluid path. In some aspects, the inner casing of the passive heat transfer device is shorter than the outer casing within the angled portion of the well as to create a transition portion at the termination end of the passive heat transfer device such that the working fluid can be transferred between the first and second flow paths.

In some aspects of the present invention, the vertical transfer section may comprise an operating or non-operating hydrocarbon bearing well or active subterranean fluid bearing well. The vertical transfer section may contain an outer casing or open wellbore and two or more inner tubing strings. A passive heat transfer device comprising an outer casing and an inner tubing is positioned within the angled well. A packer is inserted in the passive heat transfer device near the vertical transfer section. Through the packer are extended a first tubing string for the supply of working fluid to the passive heat transfer device and a second tubing string for the supply of heated working fluid to the surface. The vertical heat transfer section allows for the flow of working fluid together with reservoir fluid without fluid communication between the working fluid and the reservoir fluid.

In some aspects of the present invention, two or more operating modes may exist in the operation of the system. In the first operating mode, cold working fluid is fed into the first fluid path where it is heated by the surrounding subterranean material (i.e. rock, soil, radioactive waste, magma, and/or any fluid material) before returning along the second fluid path. In the second operating mode, the cold working fluid can be supplied through the second fluid path before returning along the first fluid path. In addition, the operating modes can be reversed and transitioned back and forth therebetween to vary the thermal output of the heat resource as a means of controlling production when more or less consumption is required (i.e., high or low demand of energy by the consumer). For instance, the multiple operating modes allow an operator to select an operating mode to maximize the production of the passive heat transfer device by creating the maximum temperature differential between the working fluid and surrounding subterranean material to harness the most efficient heat energy during peak energy demand. Similarly, the multiple operating modes allow an operator to select an operating mode to minimize or otherwise reduce the rate of heat transfer between the passive heat transfer device and the surrounding subterranean material by creating the desired degree of temperature differential between the working fluid and surrounding subterranean material and thereby harness the desired amount of heat energy during non-peak energy demand. By controlling the location of the harnessed heat energy, the amount of heat energy can be varied and adjusted to optimize the lifetime of the subterranean thermal reservoir.

In some aspects of the present invention, the system comprises at least one variable pump for controlling the flow rate of the working fluid within the system, including the first and second flow paths. The variable pump can be adapted to adjust the flow rate of the working fluid within the first and second fluid paths to compensate for changing consumption requirements. By controlling the flow rate within the first and second fluid paths, the amount of heat energy harnessed can be varied between peak and non-peak energy demands while still optimizing the lifetime of the subterranean thermal reservoir. As the maximum production cannot be sustained continuously without adversely affecting the reservoir by creating accelerated thermal drawdown, the overall production must average near the rate at which the heat is naturally replenished in the strata surrounding the passive heat extraction device.

In some aspects of the present invention, the system can be implemented with more than one angled well extending off a single vertical well in which a passive heat transfer device can be positioned in each respective angled extension and operably connected to the vertical transfer section. In some aspects, the outer casings of each passive heat transfer device are operably connected to the outer casing of the vertical transfer section. In some aspects, each passive heat transfer device has a separate inner tubing that converges proximate the vertical transfer section to a single inner tubing within the vertical transfer section. In some aspects, each passive heat transfer device has a separate inner tubing that converges proximate the vertical transfer section but remain separate such that the vertical transfer section has more than one inner tubing for each respective passive heat transfer device. In some aspects, a packer is inserted in the passive heat transfer device near the vertical transfer section. Through the packer are extended a first tubing string for the supply of working fluid to the passive heat transfer device and a second tubing string for the supply of heated working fluid to the surface such that the vertical transfer section has more than one pair of tubing strings for each respective passive heat transfer device.

In some aspects of the present invention, the system can be implemented with more than one vertical well with one or more one angled well extending off each respective vertical well in which a passive heat transfer device can be positioned in each respective angled extension and operably connected to the respective vertical transfer section. In this configuration, an array of passive heat transfer devices is provided. In some aspects, the respective vertical wells and respective angled wells are spaced a distance to take advantage of the advective flow of the subterranean reservoir.

In some aspects, the system with an array of passive heat transfer devices utilizes a single variable pump for controlling the flow rate of the working fluid within the system. In some aspects, each section of the array of passive heat transfer devices has a variable pump for controlling the flow rate of the working fluid within the system.

The plurality of passive heat transfer devices can be operated simultaneously or individually depending on the conditions within the subterranean zone and the consumption requirements. The independently operable passive heat transfer devices permit the operator to control the amount of thermal energy that is harnessed by the system within one or more subterranean thermal reservoirs. In some aspects in this configuration, a plurality passive heat transfer devices with shorter angled extensions can be used instead of a single passive heat transfer device with a longer angled extension. In some aspects, the angled extensions of the passive heat transfer devices are oriented in such a manner as to maximize the heat extraction from a given subterranean heat resource or various subterranean heat resources. In some aspects, the angled extensions of each of the passive heat transfer devices are oriented in a perpendicular configuration with an advective flow of the subterranean reservoir.

In some aspects of the present invention, the system can be implemented by boring a plurality of vertical wells in close proximity so as to generally define a central axis, wherein each vertical well has at least one angled well extending in an outward direction. In such a configuration, each respective vertical well and angled well have a vertical transfer section and at least one passive heat transfer device. Similarly, in some aspects, the vertical wells can be staggered such that the natural advective flow of the fluid within the subterranean zone causes the heated fluid or vapor within the zone to flow past the one or more respective angled extensions of each of the vertical wells. According to some aspects, the vertical wells can be linked to a convergence point such that the heated working fluid vapor of the each of the vertical wells and respective angled wells is consolidated to a single output, such as a turbine for power generation. In some aspects, the output is a turbine shaft connected to a vacuum pump in a desalination process.

The above summary of the various representative aspects and embodiments of the present invention is not intended to describe each illustrated embodiment or every implementation of the invention. Rather, the aspects and embodiments are chosen and described so that others skilled in the art can appreciate and understand the principles and practices of the invention. The figures with the detailed description that follow more particularly exemplify these embodiments.

BRIEF DESCRIPTION OF THE DRAWINGS

The present invention can be more completely understood in consideration of the following detailed description of various embodiments and aspects of the present invention in connection with the accompanying drawings, in which:

FIG. 1 is a schematic drawing, not to scale, of a subterranean heat system with a single vertical well bore and single angled well bore, the vertical well bore having a vertical transfer section and the angled well bore having a passive heat transfer device according to an embodiment of the present invention.

FIG. 2 is a representative schematic drawing, not to scale, of a vertical well bore and an angled well bore section extending from a portion of the end of the vertical well bore section according to an embodiment of the present invention.

FIG. 3 is an enlarged cross-sectional view, not to scale, of section 3' of the vertical well bore depicted in FIG. 2 with a vertical transfer section having an outer casing positioned therein.

FIG. 4 is a schematic diagram, not to scale, illustrating positioning of the angled portion in a substantially horizontal configuration within a subterranean layer having ideal temperature and permeability according to an embodiment of the present invention.

FIG. 5 is a cross-sectional side view, not to scale, of a bi-directional fluid transfer pipe according to an embodiment of the present invention.

FIG. 6 is a cross-sectional axial view, not to scale, of a concentric configuration of the outer casing and inner tubing of the vertical transfer section and/or passive heat transfer device of the bi-directional fluid transfer pipe according to an embodiment of the present invention.

FIG. 8 is a perspective partial cross-sectional axial view, not to scale, of a section of an outer casing for the vertical transfer section and/or passive heat transfer device according to an embodiment of the present invention.

FIG. 9 is a perspective partial cross-sectional axial view, not to scale, of a section of an outer casing for the vertical transfer section and/or passive heat transfer device with an inner tubing therein according to an embodiment of the present invention.

FIG. 11 is a schematic view, not to scale, illustrating the relative positioning of a plurality of well bores and respective vertical transfer sections and passive heat transfer devices in an advective flow stream, according to an embodiment of the present invention.

FIG. 14 is a schematic drawing, not to scale, of a subterranean heat system with a single vertical well bore and single angled well bore, the vertical well bore having a vertical transfer section and the angled well bore having a passive heat transfer device according to an embodiment of the present invention.

FIG. 15 is a diagram of a co-producing vertical wellbore containing two tubing strings in the space between the surface and a packer and a single tubing string after the packer, the vertical wellbore between the surface and packer being capable of producing resources such as oil or gas extraction and the vertical wellbore after the packer capable of producing passive heat energy.

FIG. 16 is a diagram of a co-producing well having a vertical wellbore with two lateral wellbores sealed from each other by a packer located in the junction between the vertical wellbore and the second lateral wellbore, the vertical wellbore between the surface and the packer in conjunction with the first wellbore capable of producing resources such as oil or gas extraction and the second lateral wellbore capable of passive heat transfer with a passive heat transfer device located therein.

FIG. 17 is a diagram of a co-producing well containing a vertical wellbore with a single lateral wellbore sealed from the vertical wellbore by a packer, the vertical wellbore capable of producing resources such as oil or gas extraction and the lateral wellbore capable of passive heat transfer with a passive heat transfer device located therein.

FIG. 18 is a schematic diagram, not to scale, of two sets of tubing strings within a wellbore and the one or more annular space therebetween allowing the production of oil or gas while providing the capability of passive heat transfer with two passive heat transfer devices located therein, the first respective tubing string 40a' and 48a" in fluid communication with each other and the second respective tubing string 40b' and 48b" in fluid communication with each other.

FIG. 20 is a schematic drawing, not to scale, of a subterranean heat system with a plurality of wellbores having separate passive heat transfer devices provided therein and with the heated working fluid joined above the surface, the working fluid pumped by a single variable speed pump.

Figure 7:
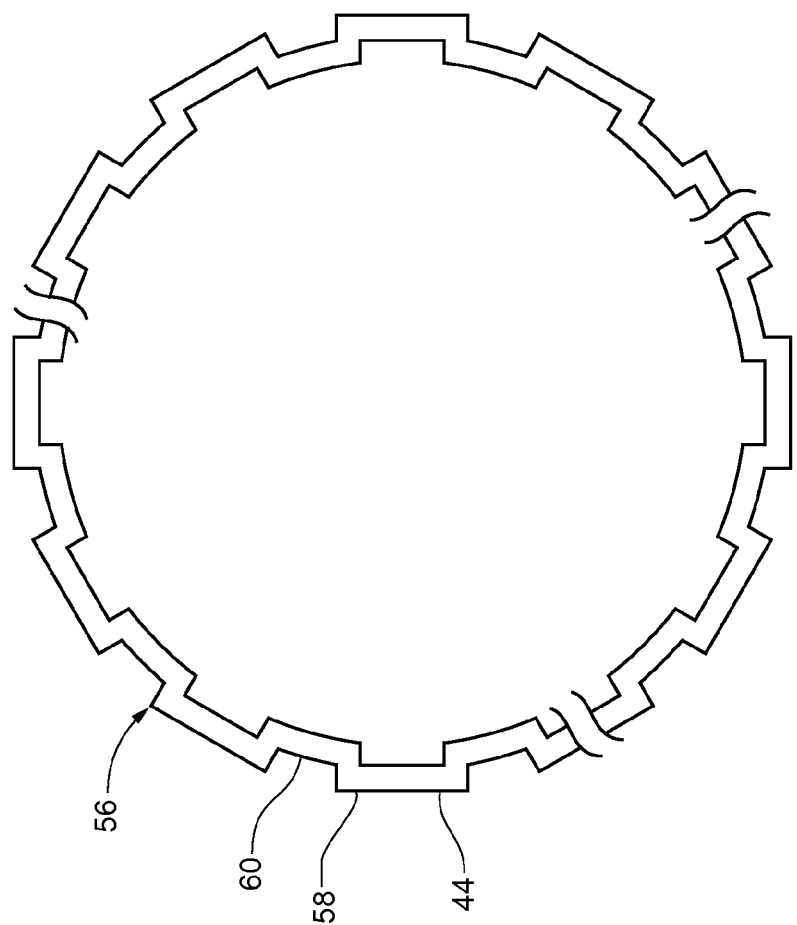
FIG. 7 is a cross-sectional axial view, not to scale, of a section of an outer casing for the vertical transfer section and/or passive heat transfer device according to an embodiment of the present invention.
Figure 10:
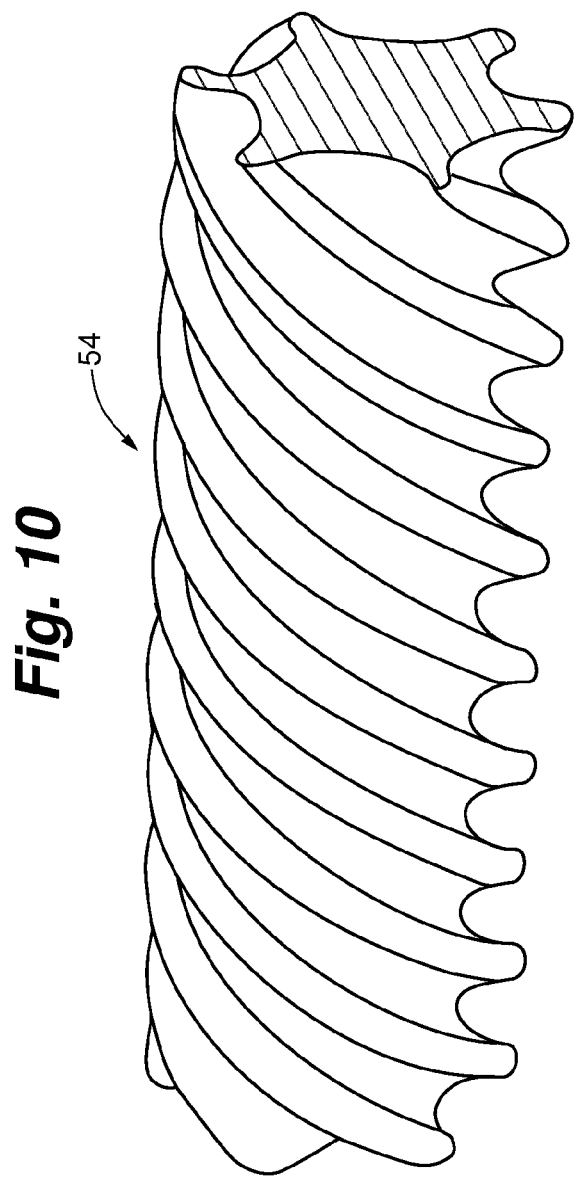
FIG. 10 is a perspective partial cross-sectional axial view, not to scale, of a section of an outer casing for the vertical transfer section and/or passive heat transfer device according to an embodiment of the present invention.

While the present invention is amenable to various modifications and alternative forms, specifics thereof have been shown by way of example in the drawings and will be described in detail. It should be understood, however, that the intention is not to limit the present invention to the particular embodiments and aspects described. On the contrary, the intention is to cover all modifications, equivalents, and alternatives falling within the spirit and scope of the present invention as defined by the appended claims.

DETAILED DESCRIPTION

As shown in FIG. 1, according to an aspect of the present invention, a wellbore at least partially extending through to a heated subterranean zone is coupled in fluid flow communication to a power production facility so as to form a closed-loop system 10. A working fluid can circulate through the closed-loop system 10 thereby facilitating the conversion of the produced energy into other useful forms of energy.

As shown in FIGS. 1-5, according to an aspect of the present invention, a system 10 for harnessing thermal energy from a subterranean zone generally comprising a well bore 20, a bi-directional transfer pipe 30 within the well bore 20, and an output apparatus 70. In some aspects, the well bore 20 comprises a substantially vertical wellbore section 22 and at least one angled wellbore section 24 extending from the vertical wellbore section 22 in a substantially horizontal configuration into one or more desired subterranean zones 15.

As shown in FIGS. 1-5 and 14, the bi-directional transfer pipe 30 further comprises a substantially vertical transfer section 32 and a passive heat transfer device 34. The vertical transfer section 32 comprises a first outer vertical casing 36 and one or more inner vertical tubing strings 40 within the outer vertical casing 36. The annular space between the outer vertical casing 36 and the one or more inner vertical tubing strings 40 defining a first vertical fluid path 38 for conveying a working fluid and the space within each of the inner vertical tubing strings 40 defining a second vertical fluid path 42 for conveying the working fluid in a direction opposite the first vertical fluid path 38. In some aspects, the first vertical fluid path 38 conveys the working fluid down to the subterranean zone and the second vertical fluid path 42 conveys a hot working fluid or vapor back to the surface location. In some aspects, the second vertical fluid path 42 within the space of each inner vertical tubing string 40 conveys the working fluid down to the subterranean zone and the first vertical fluid path 38 conveys a hot working fluid or vapor back to the surface location. As depicted in FIGS. 1, 6 and 14, in some aspects the first outer vertical casing 36 and inner vertical tubing string 40 are arranged in a concentric configuration. In some aspects, as shown in FIGS. 15-18 and discussed further herein, the vertical casing 36 is replaced with a vertical tubing 37 defining the first vertical fluid path 38 and is configured in side-by-side coaxial configuration with the inner vertical tubing string 40 defining the second vertical fluid path 42, both within the vertical transfer section 32, but can be arranged in a biaxial or other configuration for arranging tubular flow paths.

As illustrated in FIG. 1, the first and second vertical fluid paths 38, 42 are in fluid communication with the first and second horizontal fluid paths 46, 50. The outer lateral casing 44 is enclosed, and in some aspects sealed proximate the termination end 34' of the lateral extension to define an enclosed space for circulating the working fluid The inner lateral tubing string 48 is shorter than the outer lateral casing 44 to define a transition portion 52 allowing fluid flow between the first and second fluid paths 46, 48. Tubing string 40 can extend the entire length of the vertical transfer section 32 and tubing string 49 can extend at least about 70% of the length of the passive heat transfer device 34. In some aspects, tubing string 48 extends about 10% to about 95% of the length of the passive heat transfer device 34, and in some aspects substantially the entire length of wellbore 24. In some aspects, inner lateral tubing string 48 may be perforated throughout part or all of the length of the inner lateral tubing string 48 to permit flow of fluid between the first and fluid path 46, 50 in addition to the transition portion 52. Tubing strings 40, 48 can have a diameter of at least about 0.5 inches, in the range from about 1 inch to about 5 inches, and in some aspects in the range of about 1.5 inches to about 4 inches, although tubing strings of other sizes are also contemplated.

As shown in FIGS. 5 and 16-17 a well or series of wells actively producing reservoir fluid may be utilized to induce fluid flow within the reservoir. The active fluid extraction from the co-producing transfer pipe will also induce fluid flow within the reservoir and increase heat extraction from the system. In some aspects, the actively producing reservoir may be an active oil or gas production well. The co-producing transfer pipe 25 may produce a pressure differential within the reservoir and may also have a warm or hot fluid flowing concurrently with the produced vapor stream in the inner tubing. This pressure differential and/or temperature differential within the co-producing transfer pipe 25 may help to decrease the heat loss in the working fluid and increase the heat transfer within the passive heat extraction pipe 34 and/or vertical transfer section 32. The active production of reservoir fluids via the co-producing transfer pipe 25 may assist in creating fluid flow and heat replenishment within the system 10. In some aspects, an active production well may be installed to actively extract reservoir fluid from the targeted strata for the purpose of generating fluid flow and/or heat replenishment within the system, among others. This active production is used in conjunction with the passive heat extraction to increase fluid flow and provide beneficial uses for ongoing operations.

As shown in FIGS. 16 and 17 the co-producing transfer system comprises a co-producing transfer section or pipe 25 and a passive heat transfer devices 34. the co-producing transfer section 25 comprising a substantially vertical transfer section 32. The vertical transfer section 32 comprises a first outer vertical casing 36 and two or more inner vertical tubing strings 40 within the outer vertical casing 36. The tubular space within the first tubing string 40a defines a first fluid pathway 38 supplying cool working fluid to the passive heat extraction device 34. The tubular space within the second tubing string 40b defines a second fluid pathway 40 carrying hot working fluid to the surface. The annular space between the outer vertical casing 36 and the two or more inner tubing strings 40a, 40b defining a vertical fluid path 41 for conveying produced oil, gas, or other resources to the surface. The annular space may be evacuated of liquids to provide insulation for the inner tubings 40.

In some aspects, the passive heat extraction device utilizes a permanent packer 43 installed in the lateral section 24 near the junction with the vertical wellbore 22 through which two or more tubing strings 40 are inserted, as shown in FIGS. 16 and 17. In some aspects, one tubing string 40a carries cold liquid down and the other tubing string 40b carries heated liquid up to the surface. In some aspects, the lateral extension is hermetically sealed with no fluid communication between the working fluid and the liquid in the reservoir. This arrangement allows for the production of oil, gas, or other resources from the vertical wellbore 22 while also allowing the vertical section of the well to be in fluid communication with the reservoir and therefore not necessarily cased for the entire vertical extent.

In some aspects of the present invention, the system 10 can be implemented with more than one angled well 24 extending off a single vertical well 22 in which a passive heat transfer device can be positioned in each respective angled extension and operably connected to the vertical transfer section. In some aspects, the outer casings 44 of each passive heat transfer device 34 are operably connected to the outer casing 36 of the vertical transfer section 32. In some aspects, each passive heat transfer device 34 has a separate inner tubing 48 that converges proximate the vertical transfer section 32 to a single inner tubing within the vertical transfer section 32. In some aspects, each passive heat transfer device 34 has a separate inner tubing that converges proximate the vertical transfer section 32 but remain separate such that the vertical transfer section has more than one inner tubing 40 for each respective passive heat transfer device 34. In some aspects, a packer 41 is inserted in the passive heat transfer device 32 near the vertical transfer section 32. Through the packer 41 are extended a first tubing string 48a for the supply of working fluid to the passive heat transfer device 34 and a second tubing string 48b for the supply of heated working fluid to the surface such that the vertical transfer section 32 has more than one pair of tubing strings 40 for each respective passive heat transfer device 34.

The active production of reservoir fluids via the co-producing transfer pipe 25 will assist in creating fluid flow and heat replenishment within the system 10, and more specifically the targeted subterranean heat resource. In some aspects, an active production well may be installed to actively extract reservoir fluid from the targeted strata for the purpose of generating fluid flow and/or heat replenishment within the system 10, and more specifically the targeted subterranean heat resource, among others. This active production is used in conjunction with the passive heat extraction to increase fluid flow and provide beneficial uses for ongoing operations.

In some aspects, as shown in FIG. 3, bonding agent 26 can be utilized around the periphery of the vertical wellbore section 22 to provide support and insulate the vertical well section 22. In some aspects, the outside casing diameter of the vertical well bore section 22 can be about 3.5 inches to about 18 inches or more, in some aspects about 6 inches to about 12 inches, and in some other aspects about 7 inches to about 10 inches. In some aspects, the vertical length of the vertical well bore section 22 is dependent upon the desired depth of the subterranean zone for the angled wellbore section 24. In some aspects, the vertical length of the vertical well bore section 22 is about 500 feet to about 28,000 feet below the earth surface, while other deeper or shorter depths are also contemplated depending upon the depth of the desired subterranean zone. At least a portion of the vertical transfer section 32 can comprise casing 36 covering the earthen wellbore wall 22. At least about 70 percent and up to the entirety of the earthen wellbore 22 can be covered by casing. Casing can be made from any material known in the art for casing a wellbore. In some aspects, vertical transfer section 32 can comprise an operating hydrocarbon or active subterranean fluid extraction well. In some aspects, vertical transfer section 32 can comprise a "dry" active subterranean fluid extraction well.

The wellbore 20 can comprise a laterally extending section 24, which can extend from upright section 22. In one embodiment, upright section 22 can be in fluid communication with laterally extending section 24. Additionally, laterally extending section 24 can be substantially horizontal. In one embodiment, laterally extending section 24 can be drilled subsequent to producing hydrocarbons via upright section 22, thereby extending wellbore 20 into or further into the desired heated subterranean zone. In this embodiment, a window can be cut in the casing to facilitate the drilling of laterally extending section 24.

In some aspects, the length of the angled well bore section 24 can be extended into the one or more desired subterranean zones a distance of at least 500 feet up to about 30,000 feet, depending upon the lithology of the subterranean reservoir, in some aspects about 1,000 feet to about 10,000 feet, in some aspects about 5,000 feet be about 8,000 feet, while other longer or shorter lengths are also contemplated depending upon the desired subterranean zone.

After lateral section 24 has been drilled, it can be cased. Accordingly, all or at least a portion of laterally extending section 24 can comprise casing 44. In some aspects, at least about 75 percent, at least about 85 percent, or the entirety of the earthen wellbore wall of laterally extending section 24 can comprise casing 44. Casing can contain any material or materials known in the art for casing a wellbore. In one embodiment, casing can contain material such as ceramics or other materials capable withstanding extreme temperatures and pressures. Casing within the horizontal section 24 may be uncemented and in direct contact with the reservoir. Casing can also be secured to earthen wellbore wall via bonding agent 26. Bonding agent 26 can comprise any bonding agent known in the art for securing casing to an earthen wellbore wall.

As shown in FIGS. 1, 6 and 14, the passive heat transfer device 34 can comprise an outer lateral casing 44 operably connected to the first outer vertical casing 36 and an inner lateral tubing string 48 within the outer lateral casing 44, the inner lateral tubing string 48 operably connected to the inner vertical tubing string 40. In some aspects, the outer lateral casing 44 and inner lateral tubing string 48 are arranged in a concentric configuration such that the annular space between the outer lateral casing 44 and the inner lateral tubing string 48 define a first lateral fluid path 46 that is in fluid communication with the first vertical fluid path 38. The space within the inner lateral tubing string 48 defining a second lateral fluid path 50 that is in fluid communication with the second vertical fluid path 42. The inner lateral tubing string 48 may be insulated to prevent transfer of thermal energy between the working fluid transferred within the first and second fluid paths 46, 50. The inner lateral tubing string 48 may utilize spacers for the purpose of centering and stabilizing the tubing string within the casing. Spacers may be insulated to retard heat transfer. Spacers are of a low profile design so as not to interrupt fluid flow.

In one embodiment, an initial predominately liquid phase working fluid can be transported to the desired heated subterranean zone via the annular space within the casing 32, 44. Once the working fluid reaches the portion of the wellbore 24 that is in contact with the desired heated subterranean zone, indirect heat transfer from heated subterranean zone to the working fluid can occur across at least a portion of outer vertical casing 32 and/or the outer lateral casing 44. In one embodiment, the indirect heat transfer from the desired subterranean zone can cause at least a portion of the predominately liquid phase working fluid to vaporize, thereby forming a predominately vapor phase working fluid. In one embodiment, at least about 50, at least about 70, or at least about 90 percent of the predominately liquid phase working fluid is vaporized via the above-described indirect heat transfer.

The resulting predominately vapor phase working fluid can flow into the end of the lateral tubing string 48. The predominately vapor phase working fluid in tubing string 48 can flow substantially counter current to the flow of working fluid in annular space 46. In one embodiment, the predominately vapor phase working fluid can have a temperature immediately upon flowing into the tubing string 48 of at least about 120° C., in the range from about 120° C. to about 200° C., in the range from about 135° C. to about 200° C., in some aspects about 200° C. to about 600° C., in some aspects about 600° C. to about 1,200° C., in some aspects about 1,200° C. to about 6,000° C., in some aspects in the range from about 150° C. to about 200° C. Additionally, while the predominately vapor phase working fluid is flowing in tubing string 48, the pressure at the transition section 52 of tubing string 48 can be at least about 3,000 pounds per square inch ("psi"), in the range of from about 3,000 to about 14,000 psi, in the range of from about 4,000 to about 8,000 psi, or in the range of from about 5,000 to 6,000 psi.

Pressure within the system 10 may be increased or decreased to create a partial vacuum or pressure chamber for the purpose of facilitating phase change within the system 10 and efficient fluid flow. Due to the completely closed nature of the system 10, it is possible to decrease the pressure within the system 10 to allow for phase change with lower temperatures than any other system. This allows for the use of the strong gravity thermosiphon effect even at very low temperatures. Conversely pressure can be increased within the system to utilize higher temperature reservoirs and increase heat extraction efficiencies and allow broader ranges of use for working fluids. It may be necessary to vary the pressures within the individual wells that make up a system because they may individually be working in different temperatures, but since they all converge fluid streams to power a single output apparatus 70, it is desirable for the working fluids to be of the same chemistry.

In some aspects, the first outer vertical casing 36, the inner vertical tubing string 40 or both can be insulated to maintain the temperature of the working fluid during transfer between the subterranean zone and the surface location. Tubing strings 40, 48 can be formed of any material known in the art for use in a tubing string. In some aspects, tubing strings 40, 48 can comprise a material having low thermal conductivity, such as, for example, plastic or fiberglass. Additionally, at least a portion of tubing strings 40, 48 can be thermally insulated. In some aspects, at least about 75 percent, at least about 85 percent, or at least 95 percent of the total length of tubing strings 40, 48 can be insulated. In one embodiment, tubing strings 40, 48 can be filled with one or more thermally insulating materials. The insulating material employed in tubing strings 40, 48 can be any insulating material known in the art. In an some alternative aspects, commercially available insulated tubing can be employed in tubing strings 40, 48, such as, for example, insulated tubing typically employed in steam production. In some aspects of the present invention, the inner tubing 40 of the vertical transfer section 32 and/or the inner lateral tubing 48 of the passive heat transfer device 34 is insulated to insulate the second flow path 50, 42 from the first flow path 46, 38. The insulation prevents the heated working fluid returning through the second fluid path 50, 42 from being cooled by the incoming colder working fluid.

In some aspects, the tubing string may utilize spacers for the purpose of centering and stabilizing the tubing string within the casing. The tubing string may utilize insulated spacers. The tubing string may utilize spacers of a low profile so as not to interrupt fluid flow.

As the predominately vapor phase working fluid travels to the surface within the second fluid path 50, 42 within the tubing string 48, 40, the temperature of the working fluid can decrease. In some aspects, the temperature of the predominately vapor phase working fluid can decrease less than about 150° C., less than about 40° C., or less than about 30° C. Additionally, the pressure in tubing string 48, 40 can vary as the working fluid travels through it. In one embodiment, the pressure differential between the inner lateral tubing 48 at the transitional section 52 and the point where tubing string 40 intersects the plane of the earthen surface can be less than about 7,000 psi, less than about 4,000 psi, or less than 1,000 psi. Also, decrease in pressure and temperature can cause at least a portion of the predominately vapor phase working fluid to condense into a liquid phase. In one embodiment, less than about 20 weight percent or less than 10 weight percent of the predominately vapor phase working fluid condenses into a liquid phase while traveling through tubing string 48, 40.

In some aspects, each respective passive heat transfer device 34 in the system 10 can be operated independently from the surface. In some aspects, each respective well 20 can be operated independently from the surface.

In some aspects of the present invention, the outer casing, the inner tubing, or both the outer casing and inner tubing can further comprise at least one surface that is enhanced. In some aspects, the enhanced surface is on the outer casing surface, in other aspects the enhanced surface is on the inner tubing surface, and in still further other aspects the enhanced surface is on both the inner tubing and outer casing surface.

In some aspects of the present invention, both the inner surface and the outer surface of the outer casing 36, 44 of the vertical transfer section 32 and/or passive heat transfer device 34 are enhanced in the same direction, while in other aspects the direction of the respective enhancement is in opposite directions. Similarly, in some aspects, both the inner surface of the respective outer casing and the outer surface of the respective inner tubing of the vertical transfer section 32 and/or passive heat transfer device 34 are enhanced in the same direction, while in other aspects the direction of the respective enhancing is in opposite directions.

The enhanced casing provides an improved construction of a tubular vapor generating element which is characterized by simple and effective means for insuring substantially uniform circumferential distribution of the liquid in a liquid-vapor stream flowing over the inner wall surface of the vapor generating element irrespective of the position of the tube and without requiring any distortion of the casing or substantial weakening of the casing wall and without materially increasing its cost of manufacture or installation.

The wall-metal temperature of a tube will not rise above the temperature of the contained fluid enough to weaken or otherwise damage the tube so long as the tube is wet on the entire inner wall surface of the metal tube. If any part of the inner tube wall is dry that portion of the tube wall will tend to overheat and be damaged even with moderate heat transfer rates, in spite of the fact that other wall parts adjacent to it, either circumferentially or longitudinally, may be at safe temperatures with even higher heat transfer rates because of local wetness of those wall parts. This effect limits the average heat transfer rate and the generating capacity of the whole tube. This limitation becomes most severe if the heat transfer rate varies circumferentially in a tube that is not internally wet over its whole circumference and the more intense heating is applied to the dry portion of the tube wall.

Critical heat flux (CHF) is the heat flux at which a boiling crisis occurs accompanied by a sudden increase of the heat transfer surface or deterioration of the heat transfer rate. CHF is triggered when the liquid film disappears due to continuous evaporation and consequently the heated wall is exposed to vapor phase. In this case heat transfer from the heated wall is suddenly deteriorated and the wall temperature increases rapidly, which may cause significant damage to a system. The CHF imposes a limit in designing and operating boiling heat transfer equipment in power generation. Thus, an increase in the critical heat flux can increase the safety margins and allow for more economical design and operation at higher heat fluxes. As the capacity of the system increases, a higher heat load per unit heat transfer area is required. The most effective heat transfer mechanism is nucleate boiling, the upper boundary of which is dictated by the CHF. Therefore, efforts have been exerted to expand the regime of nucleate boiling. In this regard, enhancement of the CHF is an important aspect in the area of heat transfer.

In some aspects, the enhancements are not meant to increase or promote heat transfer between the outer annulus and the inner tubing string (tube in tube exchanger). Instead, the enhancements to the tubing string are meant to promote flow and to decrease two phase flow blockages within the respective flow path.

Among the methods for enhancement are insertion of a centrifugal flow director such as a helical coil or any apparatus for the purpose of inducing a centrifugal force on the working fluid. Enhancement may also be accomplished by grooving the casing surface (rifling) or attaching ridges, or any apparatus for the purpose of inducing a centrifugal force on the working fluid and/or increasing the surface area of the casing available for heat transfer. Enhancement may also be accomplished by the attachment or machining of fins to the casing surface or any apparatus in which the working fluid is passed over a set of heat transfer channels in a direction perpendicular, or nearly perpendicular, to the channel axis. Still further, the use of a porous coating for the purpose of reducing the liquid vapor counter flow resistance and or hindering the development of localized dryout conditions may also be utilized.

The insertion of a centrifugal flow director within the annulus between the outer casing and the inner tubing and/or within the inner tubing generates centrifugal swirl flow by acting as a flow obstacle and may increase pressure loss. In order to apply the same mass flux, pumping power may need to be increased. However, even at the same pumping power, the CHF obtained with the centrifugal flow director may be higher than that without the centrifugal flow director having an optimized design. Notably, if the heat flux is concentrated at a certain point of the tube, the centrifugal flow director can be placed at that point. By the centrifugal force generated by the centrifugal swirling motion of the fluid, liquid is forced to flow on the casing surface and vapor is forced to flow along the center line of the casing. Consequently, local velocity of the flow is increased compared to that in a smooth casing under the same mass flux. Therefore, the centrifugal force generated in the working fluid can contribute to enhancement of the CHF. Experimental CHF results on the uniform circumferential heating of a centrifugal flow casing shows up to a 50% increase of the CHF.

In cases where the unevaporated liquid is small in amount and would tend to flow along the bottom of a horizontally arranged plain casing, one side of which is subjected to more intense heating, a centrifugal flow director would cause the bottom stream of liquid to be lifted and to sweep the highly heated side. The use of the centrifugal flow directors as described will substantially increase the operating capacity of the power generation system.

The rifled surface can work as an enlarged heat transfer area and a centrifugal flow promoter, thereby enhancing heat transfer and CHF. The centrifugal flow forces the working fluid to the tube wall, retards re-entrainment of the liquid and caused drift in the radial direction, which carries the vapor to the center region. Steam/gas blanketing and film dryout at CHF conditions are thus prevented until substantially higher steam/gas qualities are reached. The strength of the swirl flow can be quantified by the ratio of centrifugal acceleration to gravity. Reduced film thickness results in an increased effective temperature difference between the casing wall and the working fluid gas-liquid interface, thereby providing more heat transfer potential.

In the operation of the rifled casing, the outer layer of the flowing fluid is deflected by the rifling in such a way as to cause a circumferential centrifugal swirl motion in at least a portion of the respective casing. When the ratio of gas to liquid by volume has become high enough the fluid that might otherwise fail to be uniformly distributed circumferentially and flow along the bottom of a horizontal tube or the outside of a bend, for example, will be caught by the rifling and caused to move around the circumference. The combined effects of surface friction of the gas and the rifled internal surface tends to distribute the liquid uniformly over the circumference of the grooved inner wall surface of the casing as the gas and liquid flow longitudinally through it, until all or substantially all of the liquid has been evaporated. With such rifled casing, the casing wall metal temperature can be maintained at a safely low value with heat transfer rates that would cause damage by overheating if plain casing were substituted.

The use of the rifled casing as described and illustrated in FIGS. 7-10 will substantially increase the operating capacity of the power generation system. It has also been found that rifling of the character described effects a decrease in the pressure drop through the system at high mass flow rates of the fluid stream, as compared to that in plain casing. The character of rifling particularly adapted for the most effective use of the invention does not decrease the flow area of the casing, or martially weaken the casing wall.

The CHF in the rifled casing may be enhanced by a factor of 1.3 to 1.6 as compared to a standard smooth casing. However the enhancement ratio depends upon the various flow conditions and geometries. The use of riled casing improves heat transfer due to the 50% to 60% increase in internal surface area over plain casing and the 50% to 60% increase in external surface area over plain casing. These improvements result in an increase in heat transfer coefficient 2.5 to 4 times that of standard casing.

In some aspects, the outer vertical casing 32 and/or outer lateral casing 44 can comprise one or more rifled portions 54 for increasing the surface area for heat transfer through the outer casings 32, 44, which is illustrated in FIGS. 7-10. The rifled portion 54 can comprise rifling 56 on the exterior surface, the interior surface, both the exterior and interior surfaces, or a portions thereof of the outer casings 32, 44. By way of example and not of limitation, the casing shown is of 8" outside diameter with the rifling 56 comprising a plurality of alternating lands 58 and grooves 60. In some aspects, the lands 58 can have a width of about 0.05" to about 1 inch, the grooves 60 can have a width of about 0.125" to about 1.5 inches, and the lands 58 and grooves 60 can have an incline of about 50-70 degrees, and in some aspects about 60 degrees, or other angles of inclination with respect to an axis that transverses the longitudinal direction of the respective casing. In some aspects, the rifling 56 provides a surface area increase of 50% to 60% per linear foot of the respective casing.

In some aspects utilizing the finned phase casing, the working fluid is passed over a set of heat transfer channels in a direction perpendicular to the channel axis. The shape of the fins 51 can be sharp rectangular, rounded rectangular, or saw-tooth, among others. For an equivalent flow and pressure drop the finned phase casing has a higher CHF limit than the rifled casing. However, the performance of the rifled casing and finned phase casing depends on the flow conditions. The method of CHF enhancement should be selected according to the specific flow conditions of purpose.

In some aspects, this device combines the advantages of finned surfaces with the large heat transfer rates possible during phase change. This arrangement allows a portion (the base) of the fin 51 to operate at a temperature greater than the CHF temperature, while the remaining portion operates near the temperature of the onset of stable nucleate boiling. The liquid inside two adjacent fins and in contact with the heated wall is allowed to boil because of the high heat flux at the wall (with respect to the thermal hydraulic conditions of the working fluid), while the bulk of the fluid, in forced flow outside the fins 51, is in subcooled conditions. Once the slot is full of steam, this latter undergoes a quick condensation in the subcooled bulk liquid, emptying the slots and easing their replenishment with cold liquid. The heated wall is rewetted as long as the increase in the temperature during the "uncovered wall" phase does not exceed the value of the Leidenfrost temperature. This continuous boiling and condensation between two adjacent fins 51 allows enhancement of the CHF, essentially on the basis of the transport of the latent heat transferred from the heated wall during boiling and transferred during condensation to the bulk liquid outside the fins. Fin size ranges from 3 to 7 mm, and the gap or distance of the space between two adjacent fins is about 2 to about 4 mm, the fin material can be either copper or molybdenum but may be any material characterized by high thermal conductivity. In some aspects, the lands of the fins are narrower than the space between them.

Finned phase casing would be the choice for extremely high heat flux environments such as magma. Compared to the conventional flow channel, the finned phase casing can enhance the CHF by a factor of 2-3 and has a relatively small space requirement. Heat transfer rates with this apparatus can approach 6 MW/m$^2$ to 10 MW/m$^2$ to 25 MW/m$^2$ in optimum conditions.

The role of a porous coated surface with respect to boiling enhancement is to increase the number of small scale cavities on the surface. The coated layer has uniform pore size in the micrometer range and high particle surface area, which creates high surface to volume ratio. Each void/pore is interconnected and assists the fluid flow towards the heated surface. The CHF enhancement is due to capillary assistance to the liquid flow towards the phase-change interface. The coated layer reduces the liquid vapor counter flow resistance and hinders the development of localized dryout conditions. Capillary pumping in porous media generates the required liquid draw, and establishes a fluid flow artery The role of enhancing the exterior of the casing is to increase the surface area available for heat transfer. The more heat that is transferred, the greater the change in temperature of the reservoir fluid. This generates a stronger convective flow in the reservoir which in turn allows heat to be extracted from a larger rock mass. The use of the foregoing described enhancements offsets the need to add more heat exchanger surface area and therefore decrease drilling and completion costs and risks.

In some aspects, the exterior surface of at least one portion of the outer lateral casing 44 contains one or more rifled portions 54. In this configuration, the lands 58 and grooves 60 transverse the longitudinal axis of the passive heat transfer device 34 to create an annular flow of the subterranean fluid material and heat convection traveling past the rifling 56, which increases the efficiency of the heat transfer between the subterranean zone and the working fluid within the first pathway 46.

In some aspects, the interior surface of at least one portion of the outer lateral casing 44 contains one or more rifled portions 54. In this configuration, the lands 58 and grooves 60 transverse the longitudinal axis of the passive heat transfer device 34 to create an annular flow of the working material within the first pathway 46, such that the heat transfer efficiency is increased between the subterranean fluid material and the working fluid.

In some aspects, the inner vertical tubing string 40 can also comprise one or more rifled portions 54 on the exterior surface, the interior surface or both the interior and exterior surfaces of the inner lateral tubing string 40. The rifling 56 on the inner vertical tubing string 40 can also create turbulent flow within the first and second flow paths 38, 42 to improve the nucleate boiling quality of the working fluid for a given heat flux, mass velocity, pressure, and to increase two-phase flow.

In some aspects, the inner lateral tubing string 48 can also comprise one or more rifled portions 54 on the exterior surface, the interior surface or both the interior and exterior surfaces of the inner lateral tubing string 48. The rifling 56 on the inner lateral tubing string 48 can also create turbulent flow within the first and second flow paths 46, 50 to improve the nucleate boiling quality of the working fluid for a given heat flux, mass velocity, and pressure.

As shown in FIGS. 1 and 14, the output apparatus 70 comprises a turbine 72 with the turbine shaft connected to a generator and being rotated by the heated working fluid or vapor to produce a quantity of power. Turbines used in binary subterranean heat facilities as well as solar thermal facilities and other type of power generation facilities are examples of potentially suitable turbines. The turbine may preferably be optimized for the specific working fluid and temperature/pressure conditions of the system. Turbine assembly 72 can comprise one or more turbines or any type known in the industry, such as, for example, steam turbines and/or expansion turbines. In one embodiment, turbine 72 utilizes pressure from produced working fluid in conjunction with expansion.

Turbine assembly 72 can be operably coupled to generator 74. For example, turbine assembly 72 can be coupled to generator 74 via an output shaft (not depicted). In one embodiment, generator 74 can be configured to convert mechanical work generated by turbine assembly 72 into another form of energy. Generator 74 can be any generator known in the industry capable of converting mechanical work into another energy form. In some aspects, the generator 74 can be an electric generator. In an alternative embodiment, turbine assembly 72 and generator 74 can be substituted with a turboalternator (not depicted).

Immediately upon introduction into turbine inlet, the predominately vapor phase working fluid can have a temperature of at least about 120° C., in the range from about 120° C. to about 600° C., in the range from about 600° C. to about 1200° C., or above 1200° C. Additionally, turbine inlet 44 can have a pressure of at least about 3,000 psi, and in some aspects in the range from about 3,000 to about 14,000 psi.

Once introduced into turbine assembly 72, the predominately vapor phase working fluid can operate to rotate the one or more turbines in turbine assembly 72. In one embodiment, rotation of the one or more turbines in turbine assembly 72 can be caused, at least in part, by expansion of the predominately vapor phase working fluid. Rotation of one or more turbines in turbine assembly 72 can generate force in the form of torque on an output shaft (not depicted).

In some aspects, the working fluid can undergo a change in temperature while passing through turbine assembly 72. In one embodiment, the working fluid's temperature differential can be measured by determining the difference in temperature of the working fluid at the turbine inlet and the turbine outlet. Additionally, a pressure differential can exist between turbine inlet and turbine outlet. In one embodiment, the pressure differential between the turbine inlet and the turbine outlet can be in the range from about 500 to about 8,000 psi.

In some aspects, the output apparatus 70 utilizes the mechanical work from the turbine shaft directly to power the variable pump 76.

Figure 13:
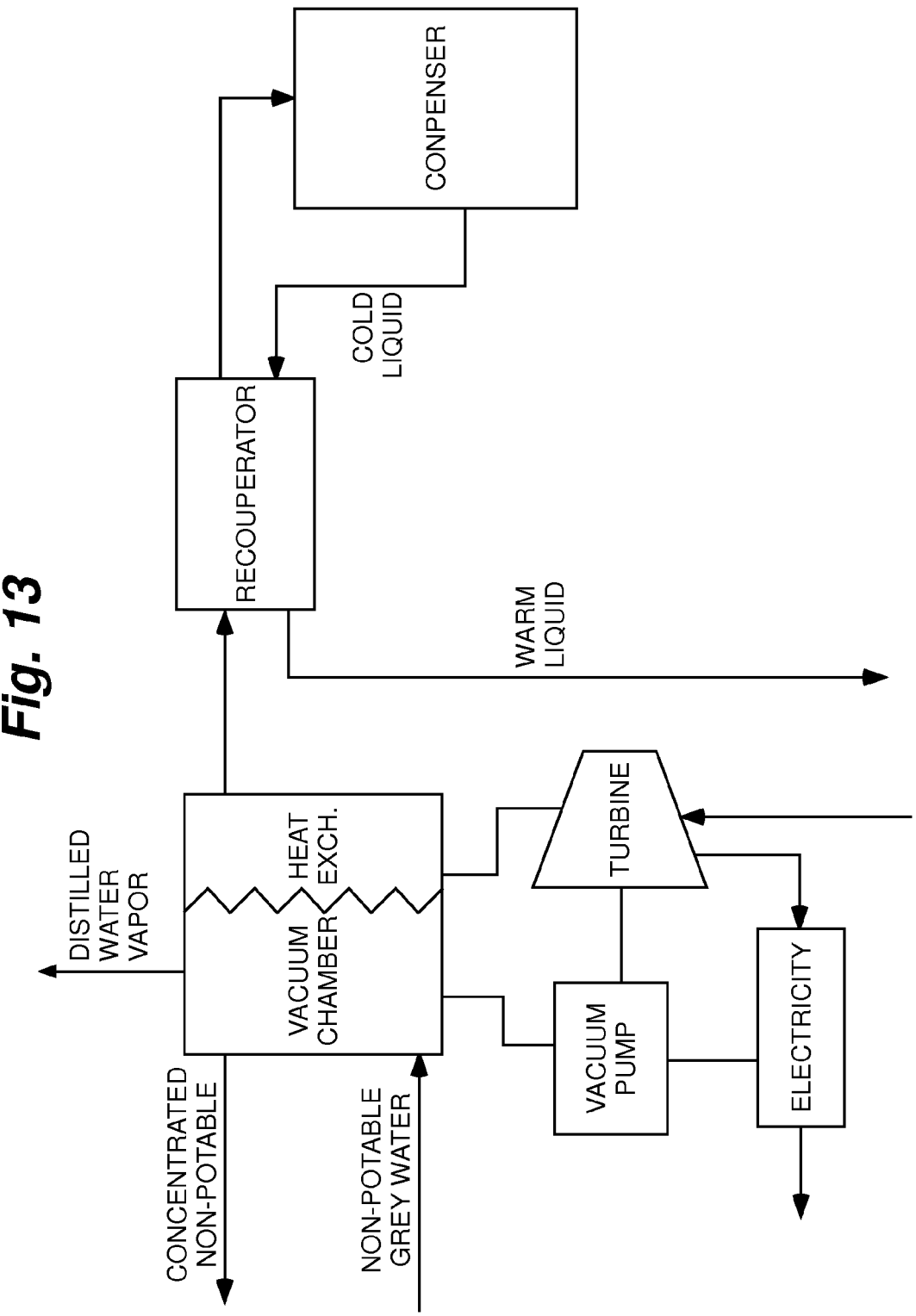
FIG. 13 is a block diagram schematic of an output apparatus according to an embodiment of the present invention.
Figure 19A:
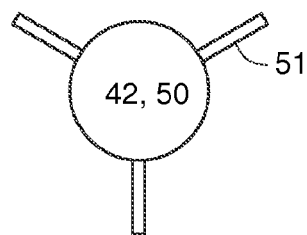
FIG. 19 is a schematic diagram, not to scale, of fins provide on the inner tubing strings 40 and/or 48 according to an embodiment of the present invention.
Figure 19B:
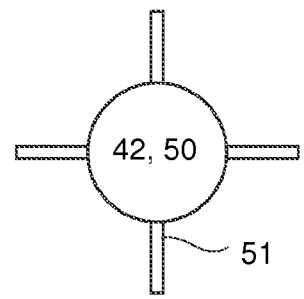
Figure 19C:
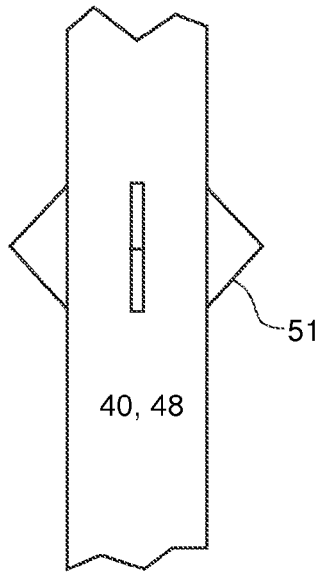
Figure 19D:
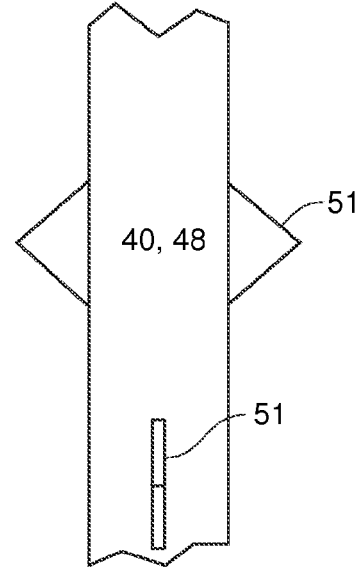

In some aspects, as shown in FIG. 13, the output apparatus 70 can comprise a distillation apparatus 74 operated by the heated working fluid. In this configuration, the turbine shaft is connected to a vacuum pump, which evacuates a vacuum chamber containing non-potable water by decreasing the pressure. Heat from the system may also be transferred to the vacuum chamber via a heat exchanger, which causes the non-potable water to boil and distilled water vapor being driven off that is captured. The remaining concentrated non-potable water mixture is evacuated. The distillation apparatus 74 works in a continual loop. The heated distilled water can then be cooled in a condenser before being utilized or it can be distributed in the hot state for use in processed requiring thermal energy as well as potable water. A centrifugal separator may be utilized to separate solids for use in biomass or other uses. The system may, alternately, drive off all moisture allowing for the utilization of entrained minerals or other products.

In some aspects, the system further comprises a cooling system 78, such as a condenser, having a heat exchanger 80 for cooling the working fluid with a cooling stream 82 comprising water, air or other means known in the art. The working fluid is preferably cooled to a desired temperature after the output apparatus 70. In some aspects, the working fluid after the output apparatus 70 contains enough thermal energy such that the heat energy can be transferred by the heat exchanger 80 for additional heating processes. Cooling systems may use wet (i.e. water) cooling or dry (i.e. air) cooling, or other means as known in the art. In one embodiment, the working fluid can have a flow rate through the entire loop of at about 5 or at least about 50 barrels per minute.

In the cooling system 78, the pre-cooled working fluid can have its temperature further reduced so as to form a cooled working fluid. The working fluid can have a reduction in temperature in the cooling system 78 sufficient to produce a cooled working fluid having a temperature in the range from about 5° C. to about 80° C. The resulting cooled working fluid can be a primarily liquid phase working fluid. The cooled working fluid can be discharged from the cooling system 78 and routed to pump 76.

Heat transfer to a secondary fluid for direct use heating purposes or other purposes may be used in conjunction with or in lieu of traditional cooling processes. A heat exchanger 80 may be placed after the turbine 72 but before the cooling system 78 and before a recuperator 90 for the purpose of transferring heat to a secondary working fluid to be used for purposes such as industrial heat or district heating, among others.

Direct use heat production can, in some aspects, be the sole output from the system 10. In this embodiment, produced fluid transferred to an above ground heat exchanger 80, which transfers heat to a secondary working fluid or to perform some other operation such as preheating for an industrial process or absorption cooling.

Figure 21:
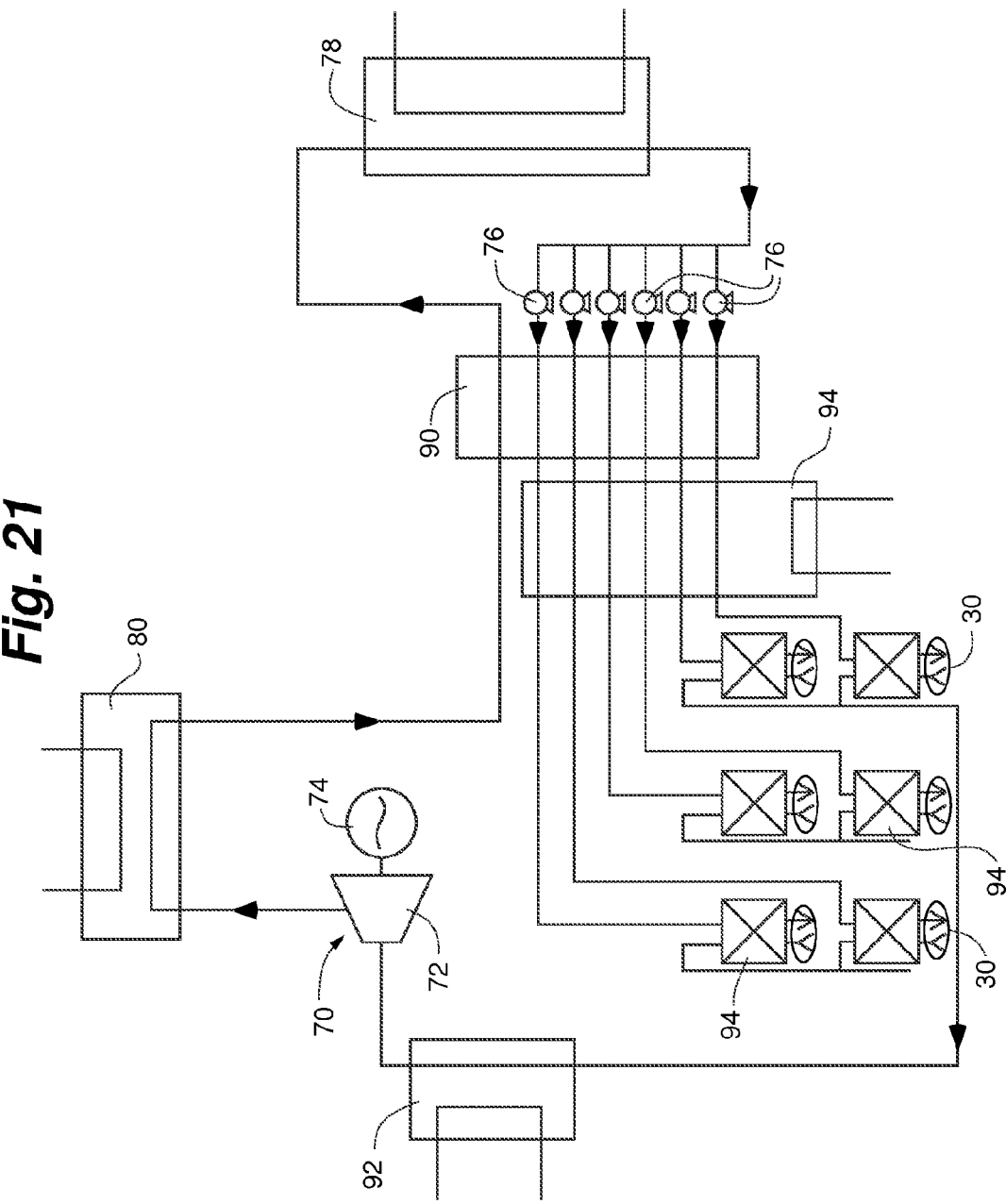
FIG. 21 is a schematic drawing, not to scale, of a subterranean heat system with a plurality of wellbores having separate passive heat transfer devices provided therein and with the heated working fluid joined above the surface, the working fluid for each respective wellbore and passive heat transfer device pumped by a separate variable speed pump.

The system 10 may also utilize a heat recuperation device 90 for the purpose of preheating the working fluid prior to reinjection. In some aspects, as shown in FIGS. 20 and 21, heat exchanger 80 can comprise a first pass and a second pass. Turbine outlet can be coupled in fluid flow communication with the first pass. In some aspects, the first pass of heat exchanger 80 can be coupled in fluid flow communication with a cooling system 78. Cooling system can be a condenser of any type known in the art operable to at least partially condense a primarily vapor phase working fluid, as will be discussed in greater detail below. In one embodiment, the condenser can comprise a wet cooling tower, an air cooled condenser, a direct water cooling system, or any cooling system known in the art. In one embodiment, the temperature of the working fluid can be decreased in the first pass by at least about 50° C. The pre-cooled working fluid can be discharged from the first pass of heat exchanger 80.

After exiting pump 76, the pressurized working fluid can be routed to second pass of heat exchanger. While flowing through the second pass, the pressurized working fluid can have its temperature increase via indirect heat exchange with the expanded working fluid flowing through the first pass, thereby forming a preheated working fluid. In one embodiment, the pressurized working fluid can have its temperature increased at least about 50° C.

In some aspects, the system can be utilized in such a way as to have an injection temperature greater than the production temperature so as to cause a storage of thermal energy in the subterranean resource. The utilization of a single phase working fluid or other working fluid may be applicable in this process. A heat exchanger 94 may be utilized within the system positioned after the pump 76 to add heat energy to the working fluid prior to injection. If the working fluid is of a higher temperature prior to injection when compared to the temperature of the subterranean reservoir it is possible to add, store, or sequester heat within the reservoir for the purpose of later extraction.

The use of additional heat sources may be used to boost the temperature of the produced working fluid prior to introduction into the output apparatus. Sources may include waste heat from power generation, industrial processes, natural gas, biomass, methane, solar thermal or any other high temperature or moderate temperature resource. The boosting may substantially increase the power generation capacity of the system.

The use of additional heat sources may be used to boost the temperature of the working fluid prior to injection into the closed loop system. Sources may include waste heat from power generation, industrial processes, natural gas, biomass, methane, solar thermal or any other high temperature or moderate temperature resource. The boosting may substantially increase the power generation capacity of the system. A heat exchanger 94 may be utilized within the system positioned after the pump to add heat energy to the working fluid prior to injection.

The use of additional resources may be used to provide an additional hot working fluid stream for use at the output apparatus 70. For example, a stream of cooled working fluid may be utilized by a second energy source, which vaporizes said working fluid through a heat exchanger 92, and provide said vaporized working fluid stream to the output apparatus 70 to be used in conjunction with the produced geothermal fluid streams in a closed loop.

In some aspects, the system 10 also contains one or more variable pumps 76 with multiple speed settings for regulating the flow of the working fluid through the bi-directional transfer pipe 30. In some aspects, the rate of variable pump 76 is adjusted to regulate the flow of the working fluid through the bi-direction transfer pipe 30 to provide the desired heat energy during various periods of energy usage during the day, such as slowing the flow rate during low-demand energy usage by the consumer or maximizing the flow rate during peak-demand energy use by the consumer or otherwise adjusting the flow rate during a daily energy cycle. By varying the flow rates of the working fluid during different periods of time in a daily energy cycle, the power output of the well is capable of being varied and the viability of the well is maximized.

In some aspects, an array of wellbores 20 with one or more bi-directional passive heat transfer devices 30 being used with one or more passive heat transfer devices 34, such as shown in FIGS. 11-12 and 20-22. In such situations, a single variable pump 76 may be used to regulate the flow of the working fluid within the bi-directional passive heat transfer devices 30. In some aspects, each of the bi-directional passive heat transfer devices 30 have a separate variable pump 76 for regulating the flow rate of the working fluid.

In some aspects, the variable pump 76 can be adapted to adjust the flow rate of the working fluid within the passive heat transfer device 34 in response to the consumption demands of the turbine 72 or the desalination process 74. For instance, a peak-demand of energy on the turbine 72 or the desalination process 74 will result in increasing the flow rate of the pump 76 and thereby increasing the rate of circulation of the working fluid within the passive heat transfer device 34. Similarly, a lower-demand of energy on the output apparatus 70 will result in the flow rate of the pump 76 being decreased to thereby reduce the flow rate of the working fluid within the passive heat transfer device 34.

Pump 76 can operate to pressurize the cooled working fluid and discharge a pressurized working fluid. The pressurization pump 76 can cause a pressure differential to exist between the cooled working fluid and the pressurized working fluid. In one embodiment, the pressure differential between the pressurized working fluid and the cooled working fluid can be in the range of from about 500 to about 10,000 psi, in the range of from about 500 to 1,000 psi, or in the range of from 500 to 1000 psi.

In some aspects, the system is provided in a modular form such that system components can be assembled off-site to be supplied to the worksite ready for installation.

In some embodiments, the passive heat transfer device 34 can be operated in at least two operation modes by changing the direction the working fluid circulated through the passive heat transfer device 34 by a crossover valve 94. In the first operational mode, the working fluid from the first vertical fluid path 38 can be supplied to the first lateral fluid path 46 such that the maximum temperature difference between the working fluid and subterranean zone is along the longitudinal length of the passive heat transfer device 34. In this configuration, the heated working fluid or vapor is returned to the surface through the second lateral fluid path 50 back to the second vertical fluid path 42. Alternatively, in a second operational mode, the working fluid can be supplied to the second lateral fluid path 50 from the second vertical fluid path 42 such that the maximum temperature difference between the working fluid and subterranean zone is exists within the transition portion 52 at the end of the passive heat transfer device 34. An operator can select the operation mode to maximize the efficiency of the passive heat transfer device 34 by targeting the hottest portions of the subterranean zone. Alternatively, the operator can adjust the operational mode to minimize the heat transfer rate of the passive heat transfer device 34 in response to a reduced consumption demands.

Crossover valve 94 may also have a throttling valve to control flowrates within the well. Crossover valve 94 may also have a letoff valve to release pressure in the event that a well is not actively flowing and pressure is building.

In some aspects, the system 10 may utilize a plurality of tubing strings to a single passive heat extraction device 34. This will allow for the reversing of flow while maintaining the optimum ratio of cross sectional area for the respective flows of liquid and gas in the system. As a point of reference, but not limitation, at any given time, approximately ⅓ of the vertical casing area will be utilized for liquid flowing to the passive heat transfer device and approximately ⅔ of the vertical casing area will be utilized for gas flowing to the surface.

Figure 12:
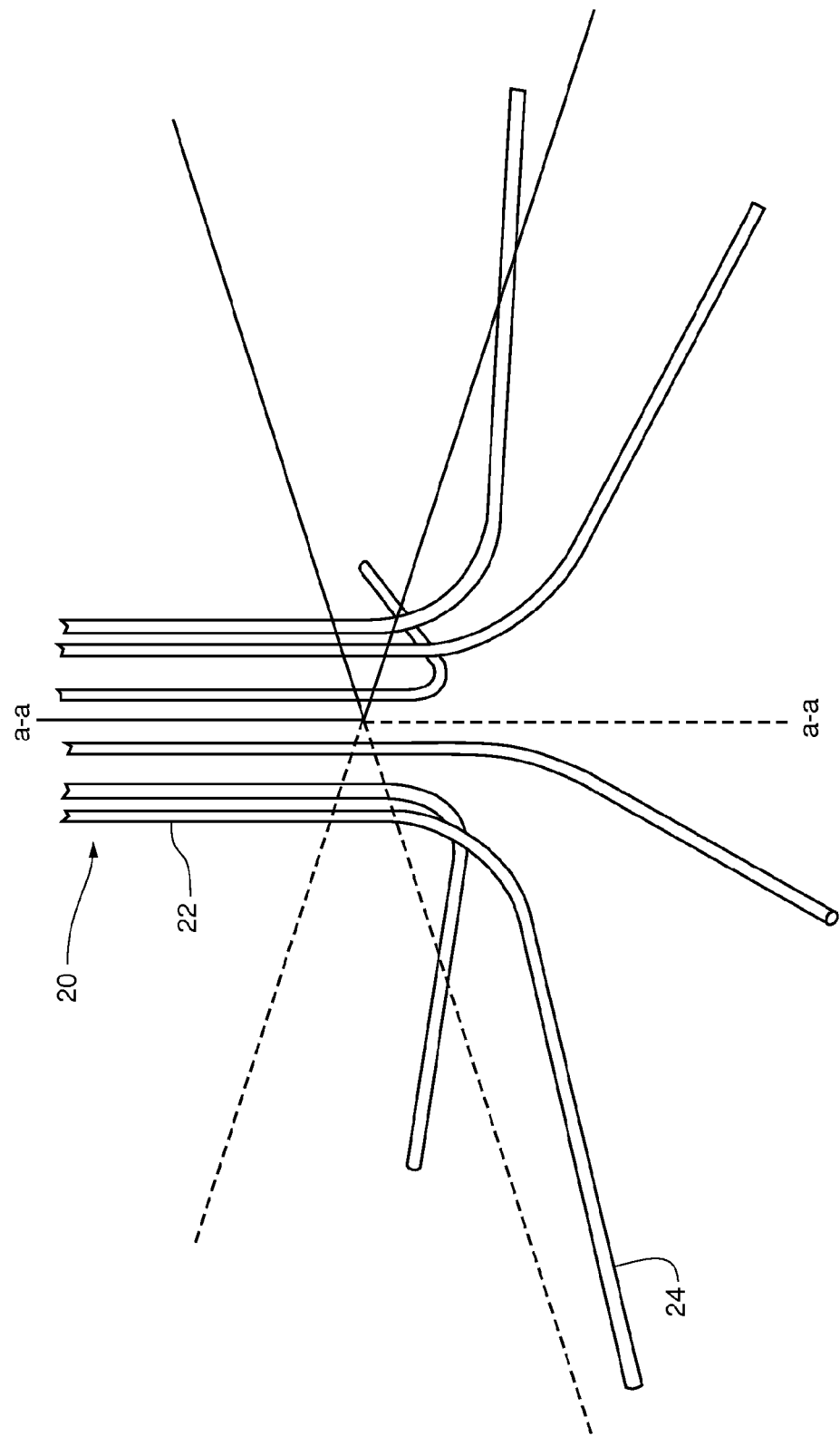
FIG. 12 is a schematic view, not to scale, of the positioning of a plurality of well bores and respective vertical transfer sections and passive heat transfer devices, according to an embodiment of the present invention.
Figure 22:
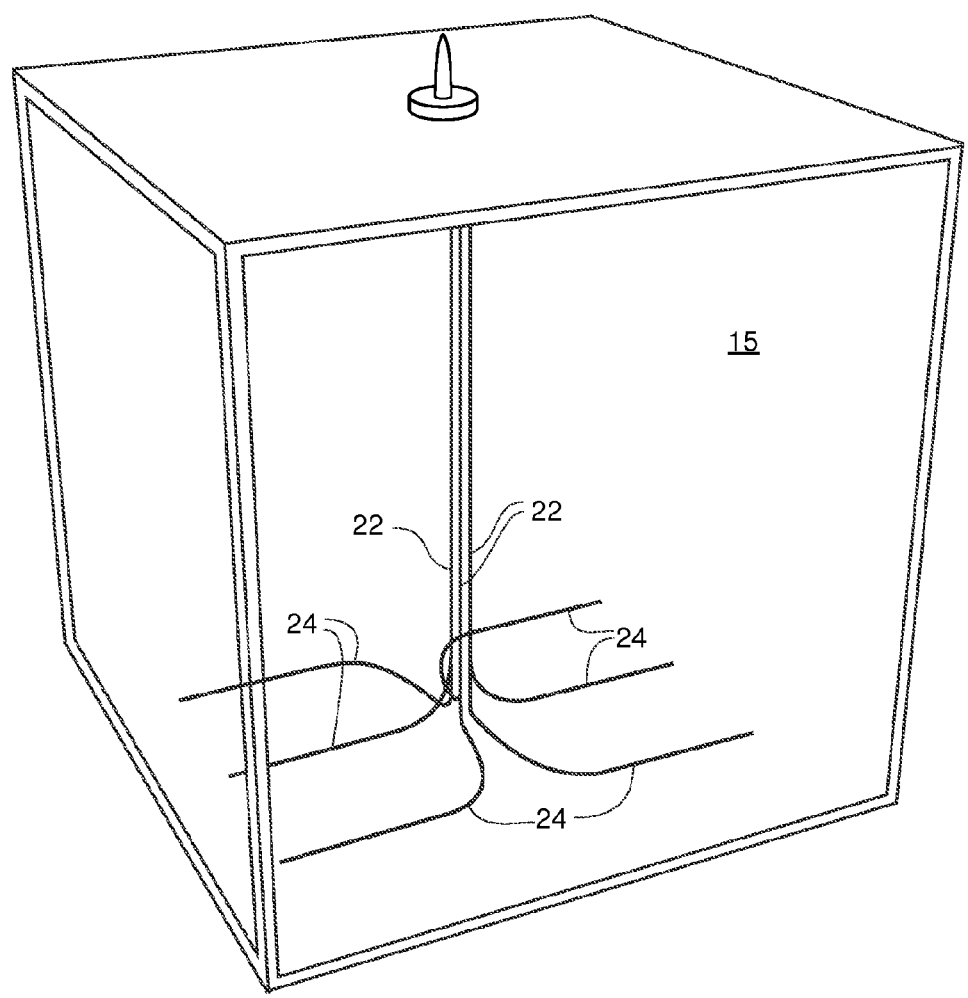
FIG. 22 is a schematic drawing, not to scale, of a subterranean heat system with two vertical wellbores and a plurality of lateral wellbores extending from each respective vertical wellbore, the wellbores capable of containing vertical transfer sections and passive heat transfer devices.

In some aspects, as shown in FIGS. 11-12 and 22, the system 10 can be implemented by boring a plurality of well bores 20 each having a substantially vertical well bore section 22 and at least one or more angled well bore section 24, wherein a bi-directional transfer pipe 30 is positioned in each well bore 20. As shown in FIG. 11, according to an embodiment, the vertical bore sections 22 (and respective bi-directional transfer pipe 30 with one or more passive heat transfer devices 34) can be spaced apart a desired distance such that the respective angled well bore sections 24 (and respective passive heat transfer devices 34) are optimally configured with respect to the advective flow of the subterranean resource or other parameters which may affect production. In some aspects, the distance between adjacent passive heat transfer devices 34 within lateral wellbores 24 is about 50 meters to about 800 meters, in some aspects about 50 meters to about 400 meters, and in some other aspects about 100 to about 150 meters. One of ordinary skill in the art will appreciate the optimal spacing will depend upon the desired subterranean zone and the resource material therein. In some aspects, the angled well bore sections 24 are in substantially the same plane, while in some other aspects the angled well bore sections 24 are in one or more different planes. In some aspects, the angled well bore sections 24 can be positioned to define a plane, wherein the plane is positioned parallel to the advective flow of subterranean materials within the subterranean zone. In some aspects, the angled bore section 24 can be positioned such that the passive heat transfer device 34 contained within each angled bore section 24 is positioned transverse or parallel to the advective flow. Alternatively, as shown in FIG. 12, the vertical well section 22 can be bored proximate to a central axis a-a, wherein the substantially angled well section 24 extend outwardly from the central axis a-a. This configuration can be particularly useful in fully exploiting a subterranean zone when only there is only narrow window through which the vertical wells 4 can be bored.

In some aspects, the space between the wellbore 20 and the bi-directional transfer pipe 30 can be provided with a material on part or all of the casing to improve the conductive properties between the bi-directional passive heat transfer device 30, particularly the passive heat transfer device 34 and the surrounding subterranean material 15. In some aspects, the material may be cement, graphite material, or other conductive material. In some aspects, the bi-directional passive heat transfer device 30 is comprised of a conductive material, such as metal, steel, alloys, or other conductive materials.

In some aspects, the desired heated subterranean zone can comprise a heated subterranean aqueous reservoir. Heated subterranean aqueous reservoirs useful in the current invention can be naturally occurring, artificially created, or combinations of naturally occurring and artificially created. In some other aspects, the desired heated subterranean zone can comprise a subterranean nuclear waste storage reservoir emitting thermal energy. In some other aspects, the desired heated subterranean zone can comprise a magmatic or extreme heat flux environment. Magmatic or extreme heat flux environments may be, as a matter of reference and without limitation, about 1,000° C. to about 6,000° C.

In some aspects, the working fluid can be any substance that provides a substantial thermosiphon effect. This liquid must be more dense at injection temperatures and pressures than at production temperatures and pressures. This liquid ideally undergoes a phase change in the passive heat transfer device 34, changing from a substantially liquid phase to a substantially gas phase at an elevated temperature and pressure at or around about 120° C. to about 200° C., in some other aspects about 200° C. to about 600° C. However temperatures nearer to the core of the earth or active magma chambers may reach nearer to 6,000° C., which is greatly out of the range of operation of the current state of the art, but technically feasible for heat extraction with the foregoing disclosed system. Suitable working fluids include water, isopentane, isobutane ethanol, methanol or other hydrocarbons, carbon dioxide, among others.

The use of additives, such as surfactants or mixture fluids, may be used to decrease the surface tension. By decreasing the surface tension of the fluid, the contact angle for flow boiling is also decreased. Consequently, bubbles with smaller diameter depart from the heated wall in a shorter time period. Boiling heat transfer thus becomes vigorous and it is expected that the CHF will also be enhanced.

The use of additives which serve to increase the specific heat of the working fluid or otherwise increase the amount of heat energy carried per unit of working fluid. Ammonia and water would be an example.

In some aspects, the system 10 comprises a multiple wells with over 400,000 to 800,000 square feet of underground passive heat transfer surface area to interact with the targeted subterranean material 15 capable of large quantities of utility scale energy production.

Referring back to FIG. 1, a cycle of the system 10 is provided by the working fluid flowing by gravity down into the first vertical path way 38 between the outer vertical casing 36 and the inner vertical tubing string 40 until it reaches the first lateral path way 46 in the passive heat transfer device 34. Heat energy is transferred between the subterranean material 15 and the working fluid via the outer lateral casing 44 of the passive heat transfer device 34. Upon enough heat energy being provided to the working fluid by the subterranean reservoir, the working fluid vaporizes with the hot vapors transversing the remaining longitudinal length of the passive heat transfer device 34 until the vaporized working fluid reaches the transition portion 52 and flows in the second lateral flow path 50 within the inner lateral tubing string 48. The hot vapor working fluid under pressure flows out of the passive heat transfer device 34 and the vertical inner tubing 40 of the vertical transfer section 32 until the hot vapor working fluid reaches the output power system 70, which is used to generate power when the output power system is a turbine 72 or produce desalinated water when the output power system 70 is a desalination apparatus. Heat is then rejected from the system 10 via a heat exchanger 80 for cooling the working fluid with a cooling stream 82 comprising water or air. The cooled working fluid is then returned to the first vertical path 38 and the process is repeated. In some aspects, a variable pump 76 may be utilized to vary the flow rate of the working fluid as previously discussed. In some aspects, the variable pump 76 is located between the surface and the output power system 70, while in some aspects the variable pump 76 is located between the heat exchanger 80 and surface before the working fluid is provided back into the subterranean zone.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A closed-loop system for harnessing subterranean heat energy from a selected subterranean zone having a quantity of subterranean material to a surface location, the system comprising:
a first well bore comprising a first substantially vertical well bore section from the surface location to the selected subterranean zone and at least a second well bore section extending away from the first substantially vertical section in an angular direction into at least a portion of the selected subterranean zone;
a first substantially vertical transfer section having an outer casing located within the first substantially vertical well bore section;
a first passive heat transfer device extending away from the substantially vertical transfer section within the second well bore section, the first passive heat transfer device having an outer casing and an inner tubing, the outer casing of the first passive heat transfer device connected to the substantially vertical transfer outer casing, the outer casing of the first passive heat transfer device having a sealed distal end, at least a portion of the outer casing of the first passive heat transfer device having a rifled configuration, and the inner tubing of the first passive heat transfer device configured within the outer casing of the passive heat transfer device in a concentric arrangement defining a first fluid path in an annulus space between the outer casing of the passive heat transfer device and the inner tubing, the first passive heat transfer device having a second fluid path within the inner tubing, and the inner tubing having an open end proximate the sealed end of the outer casing of the passive heat transfer device such that the first and second fluid paths are in fluid communication;
a working fluid located within the first and second fluid paths; and
an output apparatus for receiving a heated working fluid from the selected subterranean zone.

2. The system of claim 1, further comprising a second passive heat transfer device extending from the first vertical transfer section, wherein the second passive heat transfer device is positioned within a second angled wellbore section extending from the first substantially vertical wellbore section.

3. The system of claim 1, further comprising a second well bore having a second substantially vertical well bore section and a second angled section extending from the second substantially vertical section; wherein the system further comprises a second substantially vertical transfer section positioned within the second substantially vertical well bore section and a second passive heat transfer device positioned in the second angled section.

4. The system of claim 3, further comprising positioning the second well bore relative to the first well bore such that the first and second substantially vertical sections are arranged in a single plane that is substantially parallel to a first axis defined by an advective flow current of the subterranean material within the subterranean zone.

5. The system of claim 4, wherein at least one of the first or second angled sections extends along a second axis parallel to the first axis defined by the advective flow current.

6. The system of claim 4, wherein at least one of the first or second angled sections extends along a second axis transverse to the first axis defined by the advective flow current.

7. The system of claim 1, wherein the outer casing of the first passive heat transfer device further defines an exterior surface and an interior surface, wherein the rifled configuration comprises rifling on the exterior surface, the interior surface, or both surfaces of the outer casing.

8. The system of claim 1, wherein the inner tubing of the first passive heat transfer device further defines an exterior surface and an interior surface, wherein inner tubing further comprises rifling on the exterior surface, the interior surface, or both surfaces of the inner tubing.

9. The system of claim 1, further comprising a variable pump positioned at the surface location and operably linked to the first substantially vertical transfer section to circulate the working fluid within the first substantially vertical transfer section and the first passive heat transfer device.

10. A bi-directional fluid transfer pipe for harnessing subterranean heat energy in a subterranean zone to a surface location, the bi-directional fluid transfer pipe comprising:
    a substantially vertical transfer section having an outer casing;
    a first passive heat transfer device extending in an angular direction away from the substantially vertical transfer section, the first passive heat transfer device having an outer casing and an inner tubing, the outer casing of the first passive heat transfer device connected to the substantially vertical transfer outer casing, the first passive heat transfer device having a sealed end located at a distal end of the first passive heat transfer device, at least a portion of the outer casing of the first passive heat transfer device having a rifled configuration, and the inner tubing configured within the outer casing of the first passive heat transfer device in a concentric arrangement defining a first fluid path in an annulus space between the outer casing of the first passive heat transfer device and the inner tubing, the first passive heat transfer device having a second fluid path within the inner tubing, and the inner tubing having an open end proximate the sealed end of the outer casing of the first passive heat transfer device such that the first and second fluid paths are in fluid communication; and
    a working fluid capable of being located within the first and second fluid paths.

11. The bi-directional transfer pipe of claim 10, further comprising a second passive heat transfer device extending away from the substantially vertical transfer section.

12. The system of claim 10, wherein the outer casing of the first passive heat transfer device further defines an exterior surface and an interior surface, wherein the rifled configuration comprises rifling on the exterior surface, the interior surface, or both surfaces of the outer casing.

13. The system of claim 10, wherein the inner tubing of the first passive heat transfer device further defines an exterior surface and an interior surface, wherein inner tubing further comprises rifling on the exterior surface, the interior surface, or both surfaces of the inner tubing.

14. A method of extracting subterranean heat energy from a subterranean zone to a surface location, the method comprising:
    positioning a substantially vertical transfer section having an outer casing within a substantially vertical well bore section;
    positioning a passive heat transfer device having an outer casing and an inner tubing within an angled well bore section extending away from the substantially vertical well bore section, the passive heat transfer device extending away from the substantially vertical well bore section within the angled well bore section, wherein at least a portion of the outer casing of the passive heat transfer device having a rifled configuration, wherein the outer casing of the passive heat transfer device having a sealed distal end, wherein the inner tubing is configured within the outer casing of the passive heat transfer device in a concentric arrangement defining a first fluid path in an annulus space between the outer casing of the passive heat transfer device and the inner tubing, the passive heat transfer device having a second fluid path within the inner tubing, and the inner tubing having an open end located proximate the sealed distal end of the outer casing of the passive heat transfer device such that the first and second fluid paths are in fluid communication;
    feeding a quantity of working fluid into the substantially vertical transfer section;
    returning at least a portion of the quantity of working fluid through the substantially vertical transfer section to the surface location after heating within the subterranean zone; and
    extracting energy from the portion of the heated working fluid returned to the surface location.

15. The method of claim 14, wherein the working fluid is fed initially into the first fluid path before returning through the second fluid path.

16. The method of claim 14, wherein the working fluid is fed initially into the second fluid path before returning through the first fluid path.

17. The method of claim 14, further comprising adjusting the flow rate of the working fluid through the passive heat transfer device according to the required consumption.

18. The system of claim 1, wherein the output apparatus comprises a turbine rotatable by the heated working fluid.

19. The system of claim 1, wherein the output apparatus comprises a desalination system powered by the heated working fluid.

20. The system of claim 1, wherein the output apparatus comprises a heat exchanger located at the surface for transferring the heat energy from the heated working fluid.

* * * * *